United States Patent
Robbins

(10) Patent No.: US 9,958,684 B1
(45) Date of Patent: May 1, 2018

(54) COMPACT DISPLAY ENGINE WITH MEMS SCANNERS

(71) Applicant: Microsoft Technology Licensing, LLC, Redmond, WA (US)

(72) Inventor: Steven John Robbins, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days. days.

(21) Appl. No.: 15/581,332

(22) Filed: Apr. 28, 2017

(51) Int. Cl.
G02B 26/08 (2006.01)
G02B 27/01 (2006.01)
F21V 8/00 (2006.01)
G02B 27/28 (2006.01)
G02B 26/10 (2006.01)
G02B 27/00 (2006.01)
G02B 27/42 (2006.01)
H04N 9/31 (2006.01)

(52) U.S. Cl.
CPC ....... *G02B 27/0172* (2013.01); *G02B 6/0016* (2013.01); *G02B 6/0035* (2013.01); *G02B 26/0833* (2013.01); *G02B 26/101* (2013.01); *G02B 26/103* (2013.01); *G02B 27/0081* (2013.01); *G02B 27/283* (2013.01); *G02B 27/286* (2013.01); *G02B 27/4227* (2013.01); *H04N 9/3129* (2013.01); *G02B 2027/0125* (2013.01); *G02B 2027/0178* (2013.01)

(58) Field of Classification Search
CPC .... G02B 26/08; G02B 26/0833; G02B 26/10; G02B 26/103; G02B 6/0016; G02B 6/0035; G02B 5/18; G02B 5/30; G02B 2027/0125; G02B 2027/0178; G02B 27/0081; G02B 27/283; G02B 27/286; G02B 27/4227; G02B 27/0172; H04N 9/3129
USPC ...................................................... 359/201.2
See application file for complete search history.

(56) References Cited

U.S. PATENT DOCUMENTS

| 5,300,942 A | 4/1994 | Dolgoff |
| 5,486,934 A | 1/1996 | Huang |
| 5,727,098 A | 3/1998 | Jacobson |

(Continued)

OTHER PUBLICATIONS

"Wearable Low Vision Aid", Published on: Jul. 12, 2004 Available at: http://www.hitl.washington.edu/projects/wlva/ (6 pages total).

*Primary Examiner* — Euncha Cherry
(74) *Attorney, Agent, or Firm* — Mark K. Young; Mayer & Williams PC

(57) ABSTRACT

A near-eye optical display system utilizes a compact display engine that couples image light from an imager to a waveguide-based display having diffractive optical elements (DOEs) that provide exit pupil expansion in two directions. The display engine comprises a pair of single axis MEMS (Micro Electro Mechanical System) scanners that are configured to reflect the image light through horizontal and vertical scan axes of the display system's field of view (FOV) using raster scanning. The MEMS scanners are arranged with their axes of rotation at substantially right angles to each other and operate with respective quarter wave retarder plates and a polarizing beam splitter (PBS) to couple the image light into an in-coupling DOE in the waveguide display without the need for additional optical elements such as lenses or relay systems.

20 Claims, 21 Drawing Sheets

(56) References Cited

U.S. PATENT DOCUMENTS

| | | |
|---|---|---|
| 6,384,982 B1 | 5/2002 | Spitzer |
| 7,002,716 B2 | 2/2006 | Wine et al. |
| 7,633,053 B2 | 12/2009 | Wolleschensky et al. |
| 8,579,443 B2 | 11/2013 | Hudman et al. |
| 8,773,599 B2 | 7/2014 | Saeedi et al. |
| 8,888,275 B2 | 11/2014 | DeJong et al. |
| 8,933,862 B2 | 1/2015 | Lapstun |
| 9,176,265 B2 | 11/2015 | Mukawa et al. |
| 9,297,996 B2 | 3/2016 | Bohn et al. |
| 2003/0090439 A1 | 5/2003 | Spitzer et al. |
| 2015/0260994 A1* | 9/2015 | Akutsu ............... G02B 5/18 359/567 |

* cited by examiner

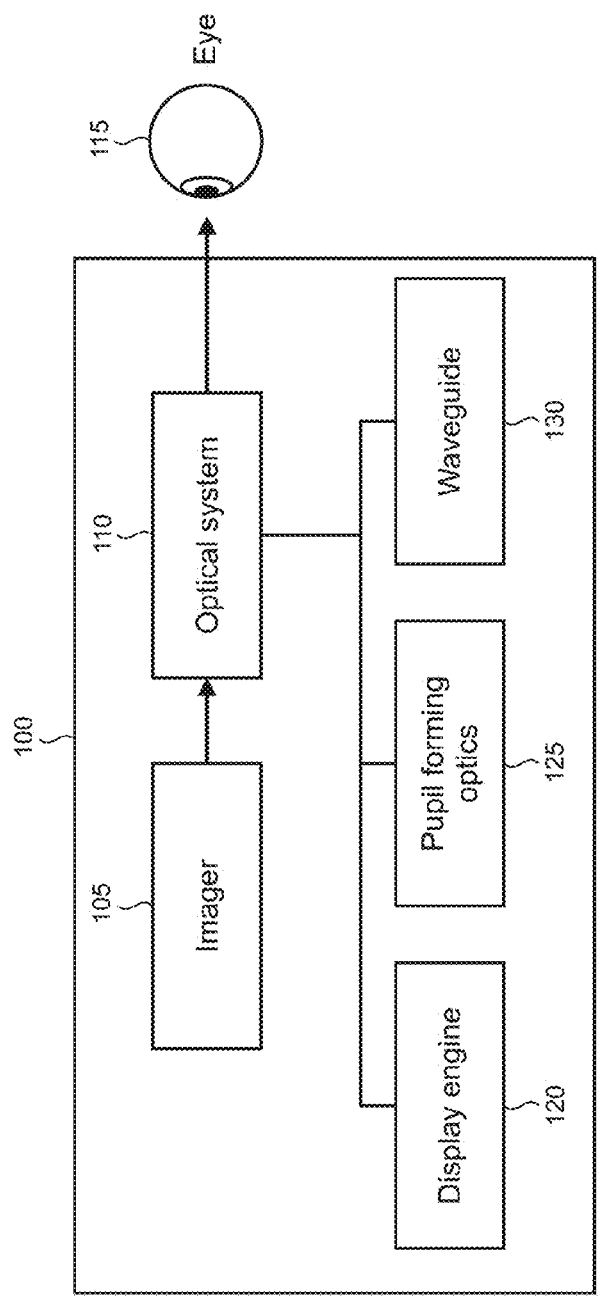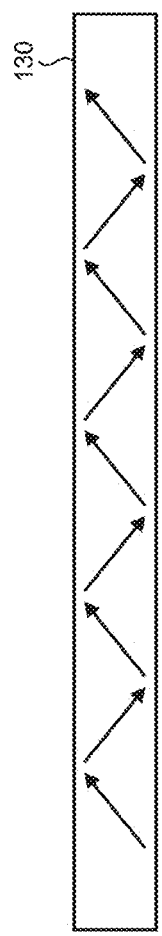
FIG 1
FIG 2

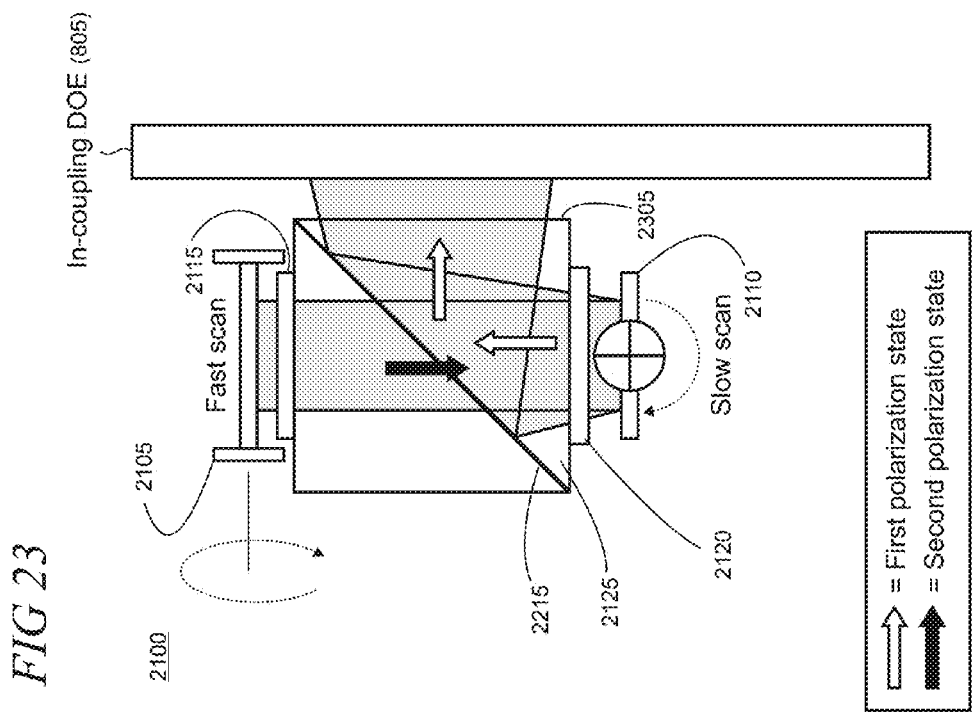
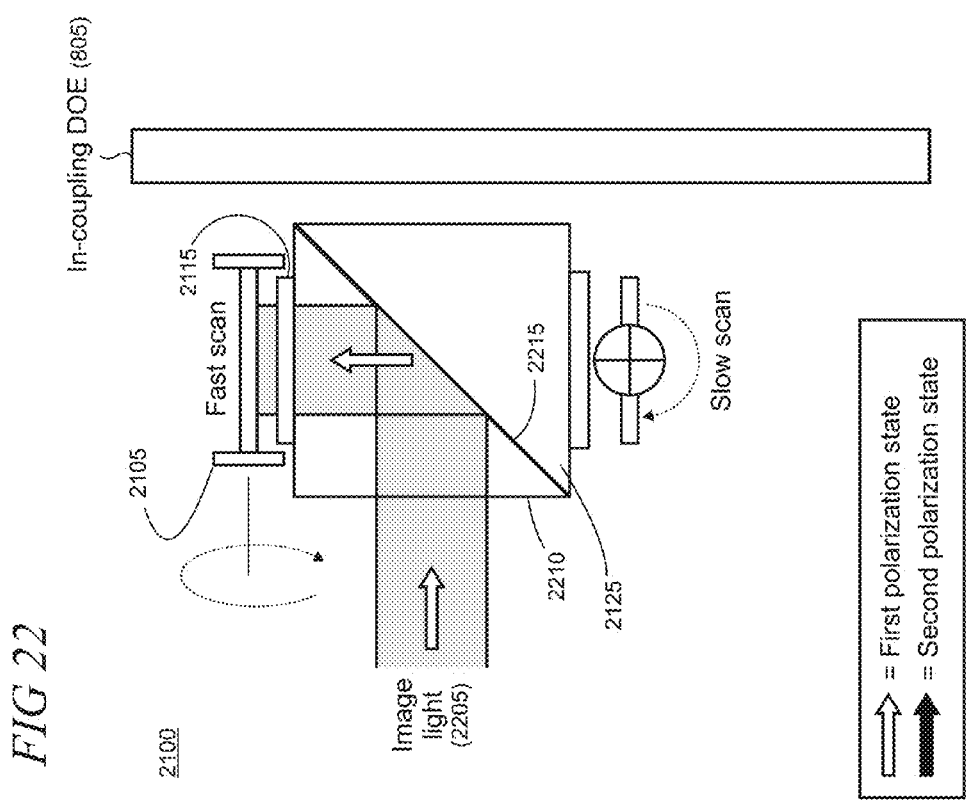

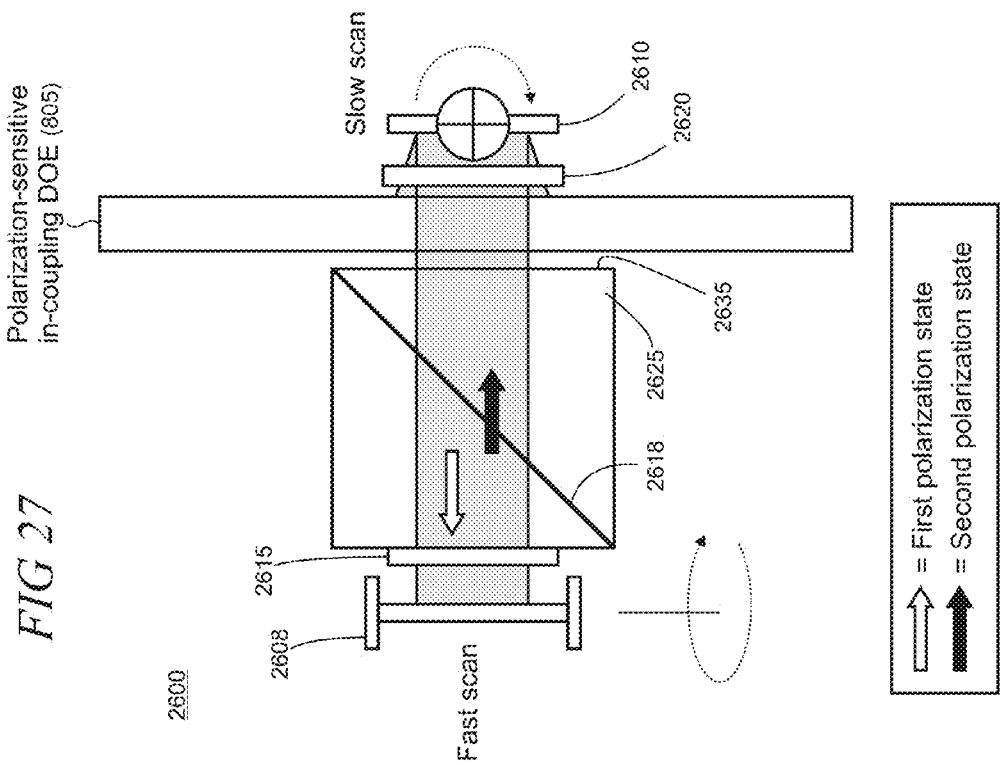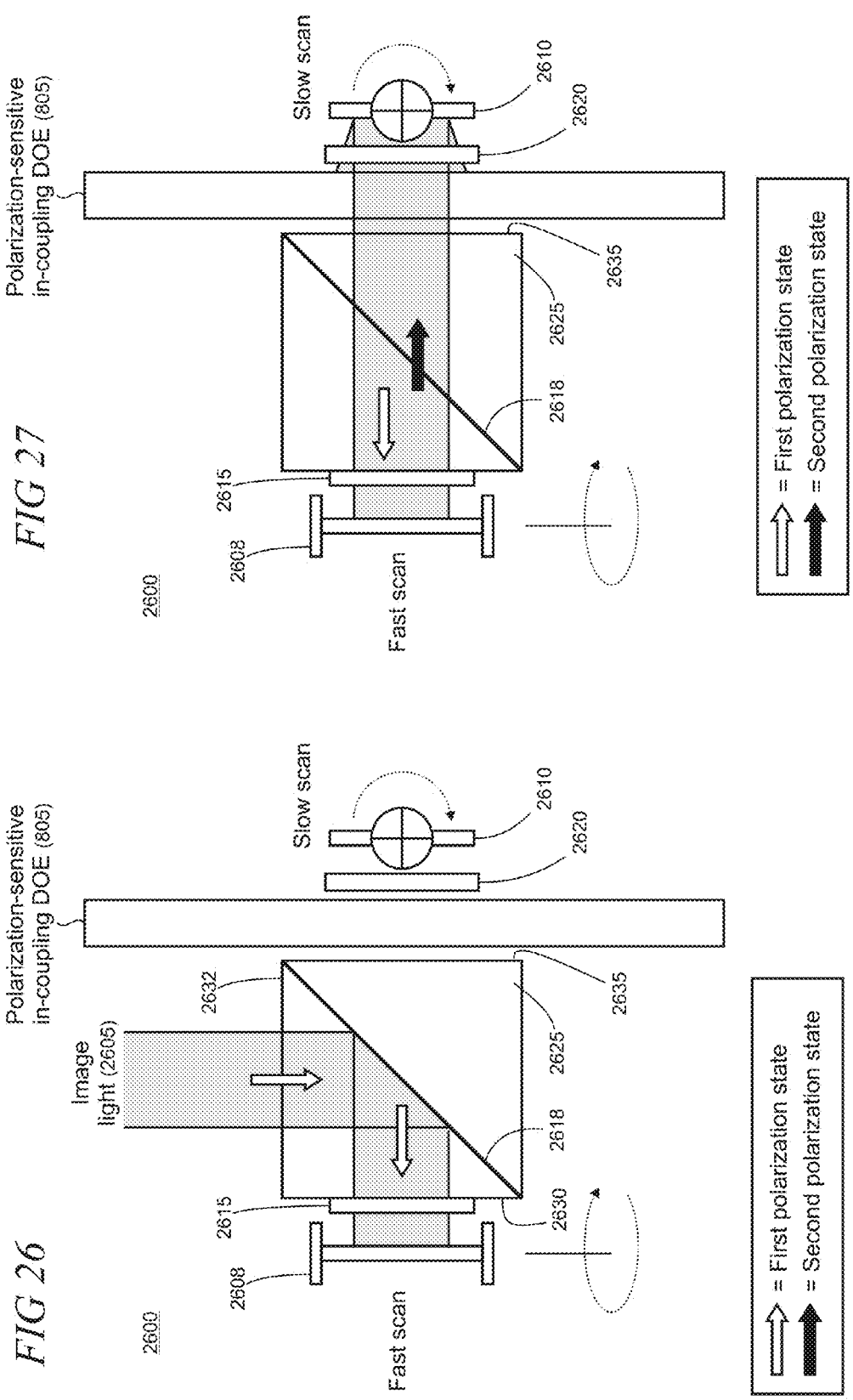

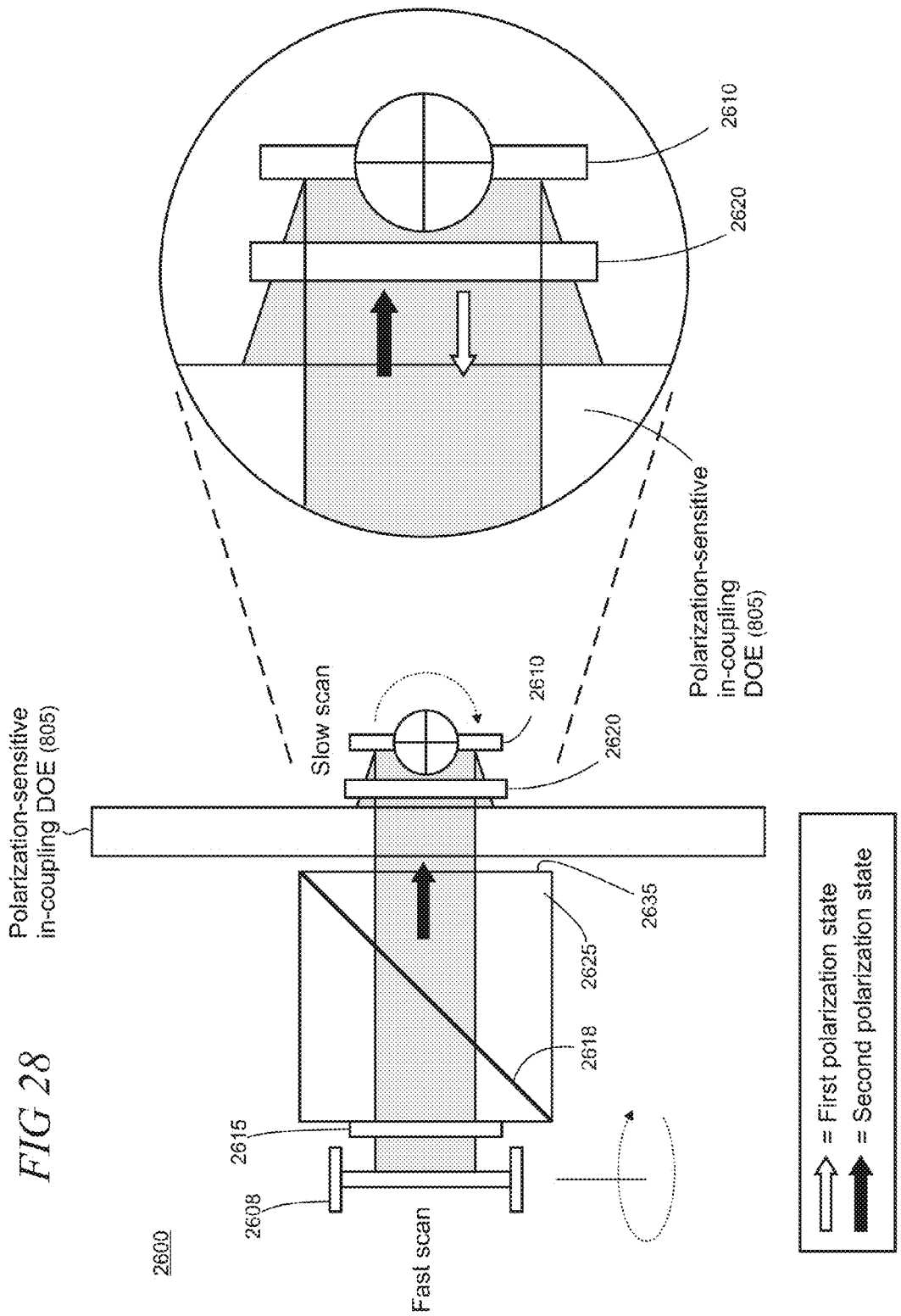

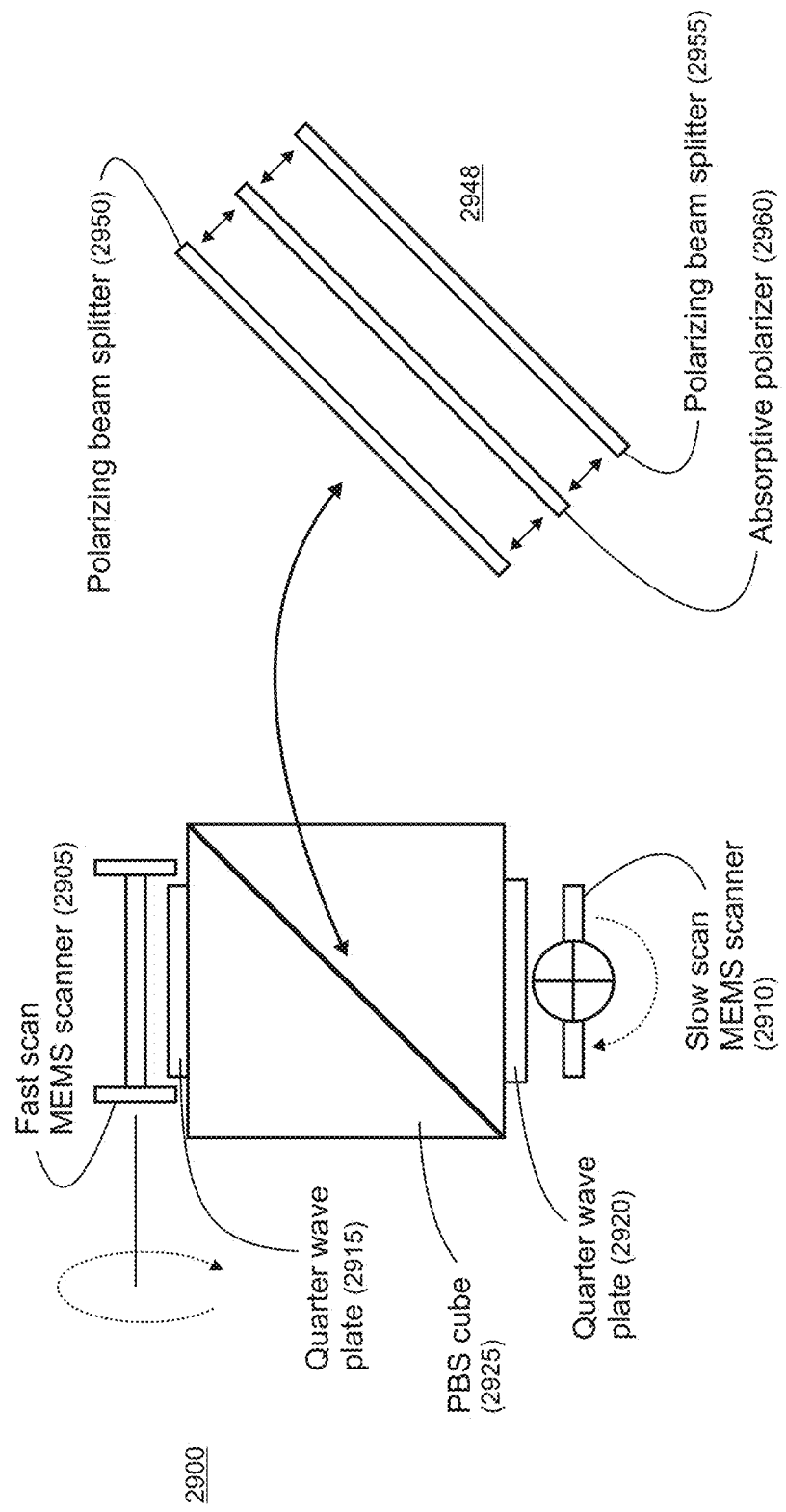

COMPACT DISPLAY ENGINE WITH MEMS SCANNERS

BACKGROUND

Mixed-reality computing devices, such as head mounted display (HMD) systems and handheld mobile devices (e.g. smart phones, tablet computers, etc.), may be configured to display information to a user about virtual and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

A near-eye optical display system utilizes a compact display engine that couples image light from an imager to a waveguide-based display having diffractive optical elements (DOEs) that provide exit pupil expansion in two directions. The display engine comprises a pair of single axis MEMS (micro electro mechanical system) scanners that are configured to reflect the image light through horizontal and vertical scan axes of the display system's field of view (FOV) using raster scanning. The MEMS scanners are arranged with their axes of rotation at substantially right angles to each other and operate with respective quarter wave retarder plates and a polarizing beam splitter (PBS) to couple the image light into an in-coupling DOE in the waveguide display without the need for additional optical elements such as lenses or relay systems. The display engine can thus be compact and lightweight which are typically desirable characteristics in many applications, particularly in wearable systems such as head mounted display (HMD) devices that can support mixed-reality and virtual-reality imaging applications.

In a first illustrative embodiment of the display engine, two MEMS scanners—a slow scan MEMS scanner (i.e., configured to sweep along one direction of the FOV) and a fast scan MEMS scanner (i.e., configured to sweep along the other direction of the FOV)—are located on opposite, top and bottom faces of a PBS cube and adjacent to two respective quarter wave retarder plates. The PBS cube comprises two right-angled prisms that are joined along their hypotenuse surfaces and include a polarization-sensitive beam splitter interface, such as a dielectric coating. The two faces of each right-angle prism opposite the hypotenuse may be used as entrance faces for impinging light on the PBS cube or as exit faces for light that is transmitted or reflected from the cube.

The beam splitter interface of the PBS cube reflects light having a first state of polarization while transmitting light having a second polarization state that is orthogonal to the first state. For example, the first and second polarization states can be s- and p-polarization states (or vice-versa). An imager which may comprise, for example, one or more lasers generates image light such as holographic virtual images used in mixed- or virtual-reality applications. The image light is polarized in the first polarization state and enters an entrance face of the PBS cube. The in-coupling DOE is located on the opposite exit face of the PBS cube. The PBS cube reflects the incident image light upwards (i.e., orthogonally to the incident image light) to the fast scan MEMS scanner located at the top face of the cube where the image light is reflected downwards back to the PBS cube.

The image light reflected by the PBS cube makes two passes through the quarter wave plate located at the top face of the PBS cube—one pass upward to the fast scan MEMS scanner and one pass downward when reflected from the fast scan MEMS scanner—and thus changes to a second polarization state. The image light in the second polarization state passes through the PBS cube, without being reflected at the interface, to the slow scan MEMS scanner at the bottom face of the PBS cube. The slow scan MEMS scanner reflects the image light upwards back into the PBS cube. The state of polarization changes back to the first state as the image light makes two passes through the quarter wave plate at the bottom face of the PBS cube. The PBS cube reflects the image light in the first polarization state out of the cube at the exit face and into the in-coupling DOE to thereby couple the image light from the imager into the waveguide display.

In a second illustrative embodiment of the display engine, a fast scan MEMS scanner and quarter wave plate are located at the top face of a PBS cube opposite the entrance face on the bottom of the cube. A slow scan MEMS scanner and quarter wave plate are located on a face of the PBS cube that is opposite the exit face at which an in-coupling DOE is located. Image light thus enters the PBS cube in a direction that is parallel to the plane of the in-coupling DOE (as compared to the first embodiment in which the image light enters the PBS cube in a direction that is orthogonal to the plane of the in-coupling DOE).

In the second illustrative embodiment of the display engine, the image light incident on the bottom entrance face of the PBS cube is initially polarized in the second state so that it is not subject to reflection at the beam splitter interface and thereby is transmitted to the quarter wave plate and fast scan MEMS scanner located at the opposite top face. As the image light reflected downward from the fast scan MEMS scanner has made two passes through the top quarter wave plate, it is changed to the first polarization state (i.e., orthogonal to the second polarization state).

The PBS cube reflects the image light to the slow scan MEMS scanner and quarter wave plate which are located on the face opposite the exit face of the PBS cube. The slow scan MEMS scanner reflects the image light back towards the PBS cube. Since the reflected image light has made two passes through the quarter wave plate, it is changed back to the second polarization state and thereby passes through the PBS cube without being reflected at the beam splitter interface and is coupled into the waveguide display by the in-coupling DOE.

In a third illustrative embodiment of the display engine, the in-coupling DOE is configured with polarization sensitivity to the first polarization state, for example, using a Bragg grating and/or two-dimensional grating structures. The in-coupling DOE is located between the exit face of a PBS cube and a slow scan MEMS scanner and quarter wave plate. A fast scan MEMS scanner and quarter wave plate are located at a face of the PBS cube that is opposite to the exit face. Image light in a first polarization state and having a direction of propagation that is parallel to the plane of the in-coupling DOE is incident on the entrance face of the PBS cube (e.g., the top or bottom face). The beam splitter interface of the PBS cube is configured with sensitivity to the first polarization state and reflects the incident image light horizontally to the fast scan MEMS scanner which reflects the image light back to the PBS cube.

The polarization state of the image light reflected from the fast scan MEMS scanner is changed to the second polarization state (i.e., orthogonal to the first polarization state) because it has made two passes through the quarter wave plate that is adjacent to the fast scan MEMS scanner. The image light in the second polarization state is transmitted, through the PBS cube without reflection at the beam splitter interface, to the in-coupling DOE. The in-coupling DOE is sensitive to a first polarization state and therefore passes the image light in the second polarization state to the quarter wave plate and slow scan MEMS scanner without in-coupling the light to the waveguide display. The slow scan MEMS scanner reflects the image light back to the in-coupling DOE. As the light reflected from the slow scan MEMS scanner has made two passes through the quarter wave plate, its state is changed to the first polarization state. The in-coupling DOE, being sensitive to the first polarization state, couples the image light into the waveguide display.

Advantageously, the display engine in each embodiment may be configured using a small form factor PBS cube that places the fast and slow MEMS scanners proximate to each other so that the scanning mirror footprints can be minimized for a given FOV to reduce the overall size and weight of the display engine. In addition, providing exit pupil expansion in the waveguide display enables the display engine to directly couple the output of the imager into the waveguide display without the need for re-imaging on a screen that may manifest visible laser speckle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 1 shows a block diagram of an illustrative near-eye optical display system;

FIG. 2 shows propagation of light in a waveguide by total internal reflection (TIR);

FIGS. 21, 22, and 23 show a first illustrative embodiment of a compact display engine using MEMS scanners;

FIGS. 26, 27, and 28 show a third illustrative embodiment of a compact display engine using MEMS scanners;

FIGS. 29 and 30 show a fourth illustrative embodiment in which a PBS cube is configured with two PBS layers and an absorptive polarizer;

Like reference numerals indicate like elements in the drawings. Elements are not drawn to scale unless otherwise indicated.

DETAILED DESCRIPTION

Figure 3:
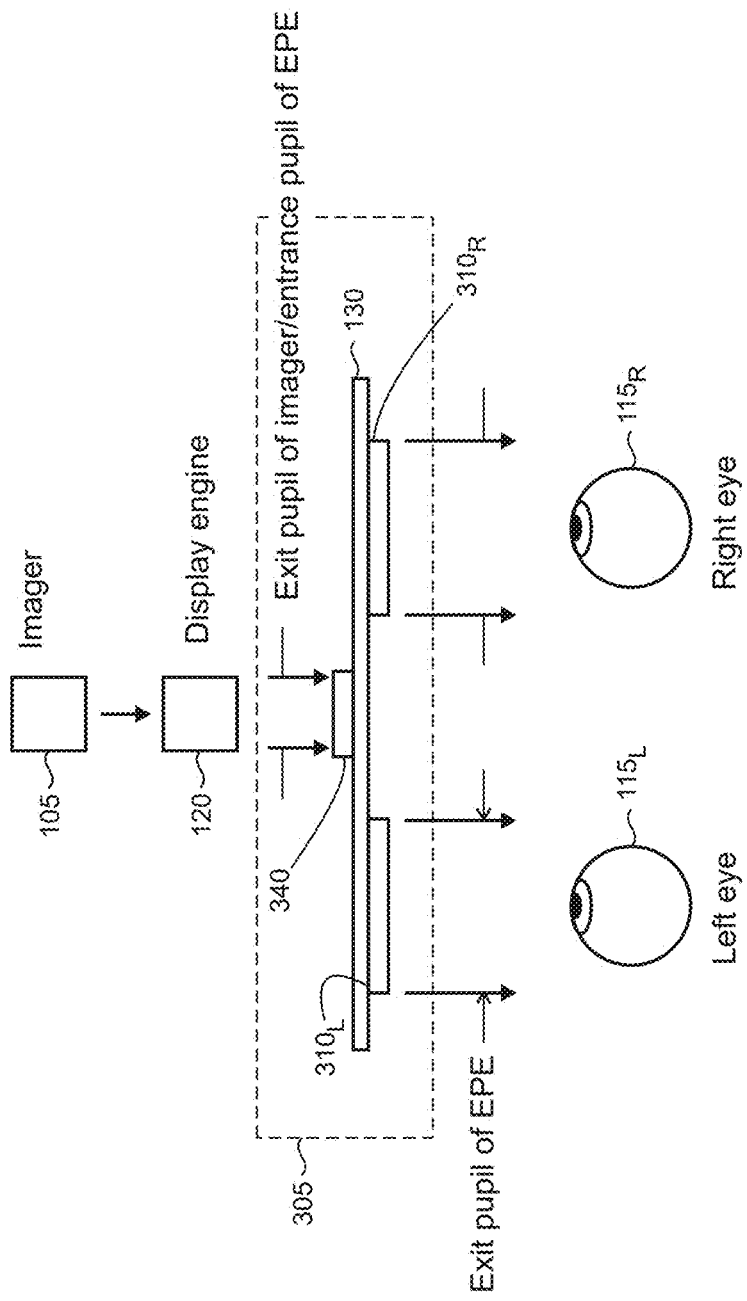
FIG. 3 shows a view of an illustrative exit pupil expander.

FIG. 1 shows a block diagram of an illustrative near-eye optical display system 100 which may incorporate a combination of diffractive optical elements (DOEs) that provide in-coupling of incident light into a waveguide, exit pupil expansion in two directions, and out-coupling of light out of the waveguide. Near-eye optical display systems are often used, for example, in head mounted display (HMD) devices in industrial, commercial, and consumer applications. Other devices and systems may also use near-eye display systems, as described below. The near-eye optical display system 100 is an example that is used to provide context and illustrate various features and aspects of the present compact display engine with MEMS scanners.

System 100 may include one or more imagers (representatively indicated by reference numeral 105) that work with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, lasers, laser diodes, or any other suitable displays or micro-displays operating in transmission, reflection, or emission. The optical system 110 can typically include a display engine 120, pupil forming optics 125, and one or more waveguides 130. The imager 105 may include or incorporate an illumination unit and/or light engine (not shown) that may be configured to provide illumination in a range of wavelengths and intensities in some implementations.

In a near-eye optical display system the imager does not actually shine the images on a surface such as a glass lens to create the visual display for the user. This is not feasible because the human eye cannot focus on something that is that close. Rather than create a visible image on a surface, the near-eye optical display system 100 uses the pupil forming optics 125 to form a pupil and the eye 115 acts as the last element in the optical chain and converts the light from the pupil into an image on the eye's retina as a virtual display.

The waveguide 130 facilitates light transmission between the imager and the eye. One or more waveguides can be utilized in the near-eye optical display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the user's head or near the forehead, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

FIG. 3 shows a view of an illustrative exit pupil expander (EPE) 305. EPE 305 receives an input optical beam from the imager 105 and the display engine 120 as an entrance pupil to produce one or more output optical beams with expanded exit pupil in one or two directions relative to the input (in general, the input may include more than one optical beam which may be produced by separate sources). The display engine 120 is described in more detail below and replaces magnifying and/or collimating optics that are typically used in conventional display systems. The expanded exit pupil typically facilitates a virtual display to be sufficiently sized to meet the various design requirements such as image resolution, field of view, and the like of a given optical system while enabling the imager and associated components to be relatively light and compact.

The EPE 305 is configured, in this illustrative example, to provide binocular operation for both the left and right eyes which may support stereoscopic viewing. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$ that are supported on a waveguide 130 and a central in-coupling grating 340. The in-coupling and out-coupling gratings may be configured using multiple DOEs, and may further include one or more intermediate DOEs as described below. While the EPE 305 is depicted as having a planar configuration, other shapes may also be utilized including, for example, curved or partially spherical shapes, in which case the gratings disposed thereon are non-co-planar.

Figure 4:
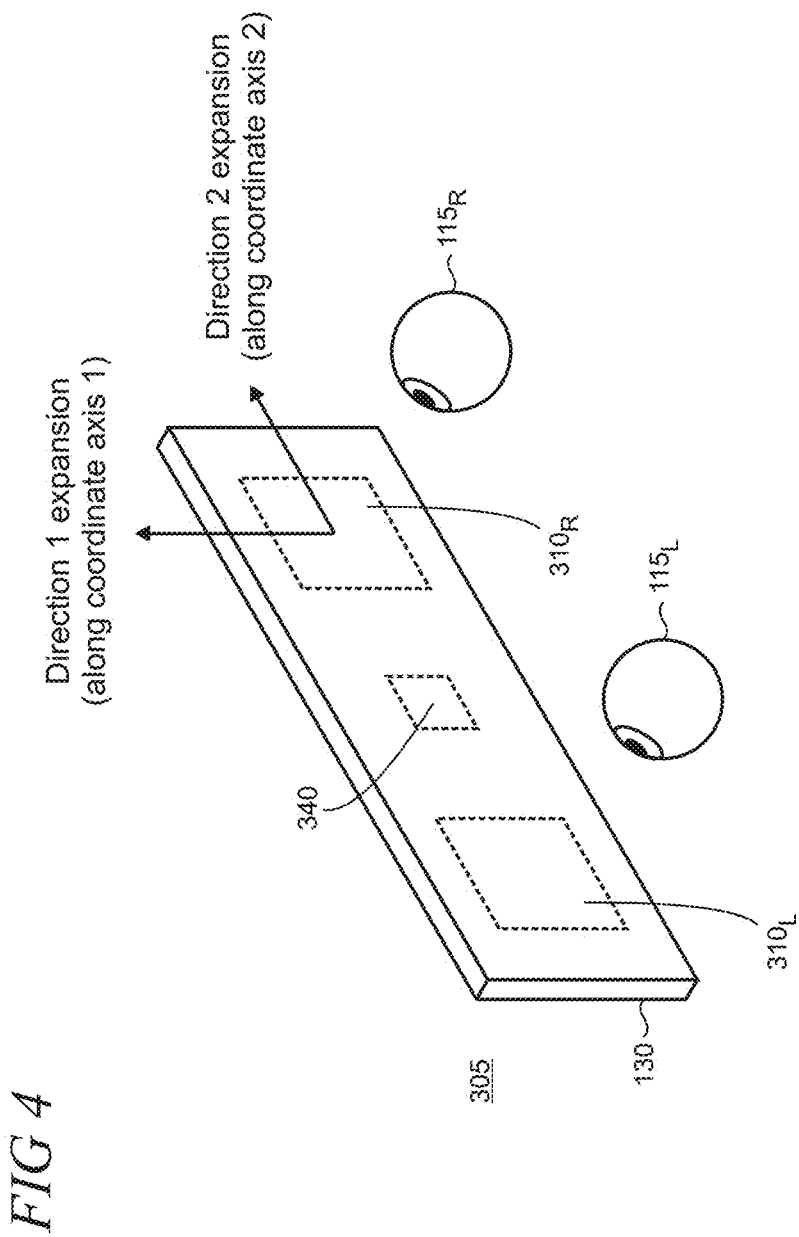
FIG. 4 shows a view of an illustrative exit pupil expander in which the exit pupil is expanded along two directions.
Figure 5:
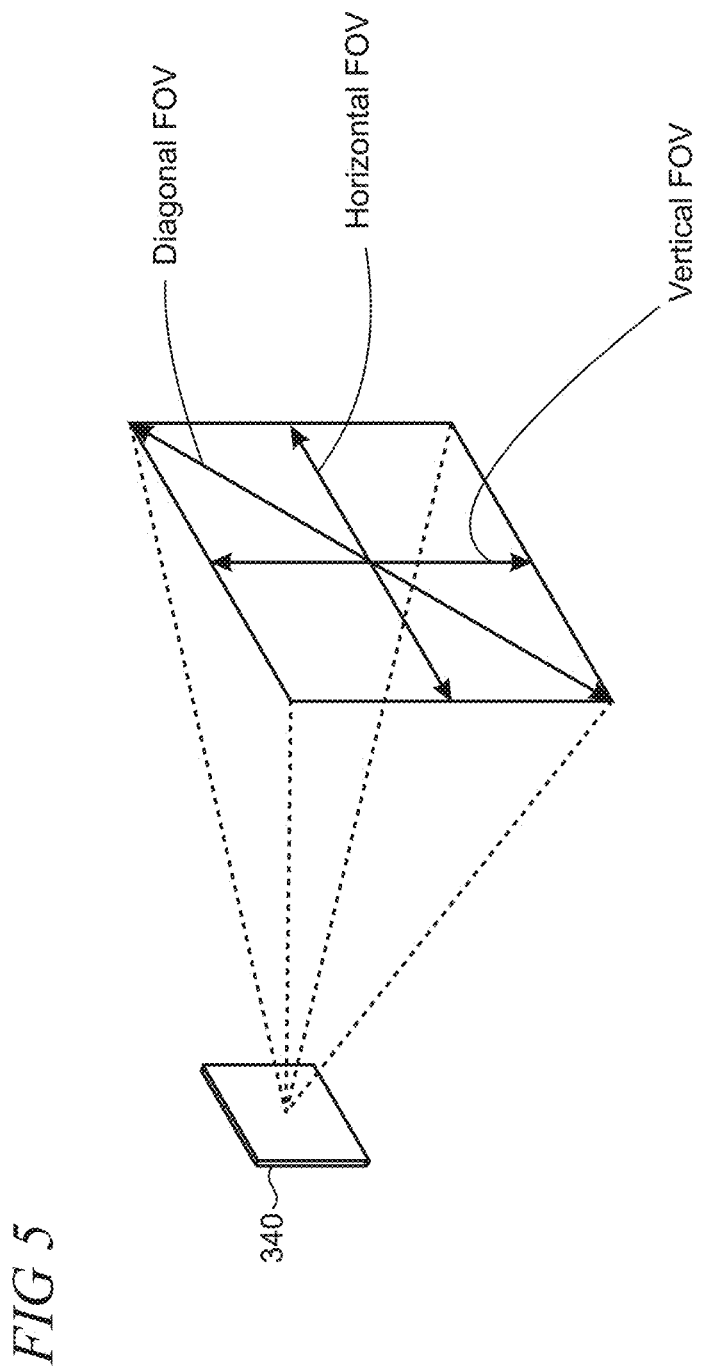
FIG. 5 shows an illustrative input to an exit pupil expander in which the FOV is described by angles in horizontal, vertical, or diagonal orientations.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye optical display device is upright and forward facing, but less intuitive for other usage scenarios. The listed terms are not to be construed to limit the scope of the configurations (and usage scenarios therein) of near-eye optical display features utilized in the present arrangement. The entrance pupil to the EPE 305 at the in-coupling grating 340 is generally described in terms of field of view (FOV), for example, using horizontal FOV, vertical FOV, or diagonal FOV as shown in FIG. 5.

Figure 6:
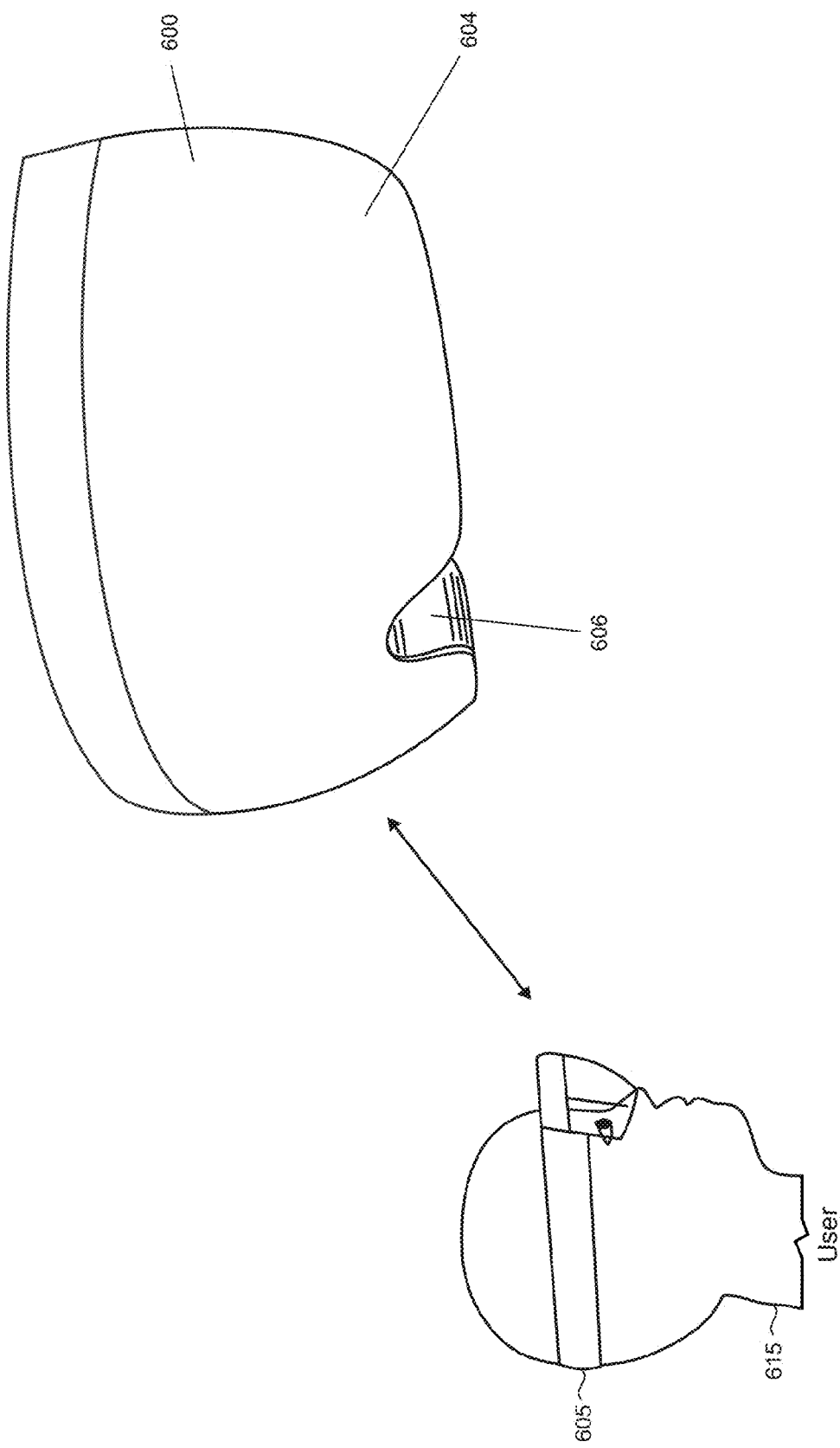
FIG. 6 shows a pictorial front view of a sealed visor that may be used as a component of a head mounted display (HMD) device.

FIG. 6 shows an illustrative example of a visor 600 that incorporates an internal near-eye optical display system that is used in a head mounted display (HMD) device 605 application worn by a user 615. The visor 600, in this example, is sealed to protect the internal near-eye optical display system. The visor 600 typically interfaces with other components of the HMD device 605 such as head mounting/retention systems and other subsystems including sensors, power management, controllers, etc., as illustratively described in conjunction with FIGS. 31 and 32. Suitable interface elements (not shown) including snaps, bosses, screws and other fasteners, etc. may also be incorporated into the visor 600.

The visor 600 includes see-through front and rear shields, 604 and 606 respectively, that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 705 shown in the disassembled view in FIG. 7.

The sealed visor 600 can physically protect sensitive internal components, including a near-eye optical display system 702 (shown in FIG. 7), when the HMD device is used in operation and during normal handling for cleaning and the like. The near-eye optical display system 702 includes left and right waveguide displays 710 and 715 that respectively provide virtual world images to the user's left and right eyes for mixed- and/or virtual-reality applications. The visor 600 can also protect the near-eye optical display system 702 from environmental elements and damage should the HMD device be dropped or bumped, impacted, etc.

Figure 7:
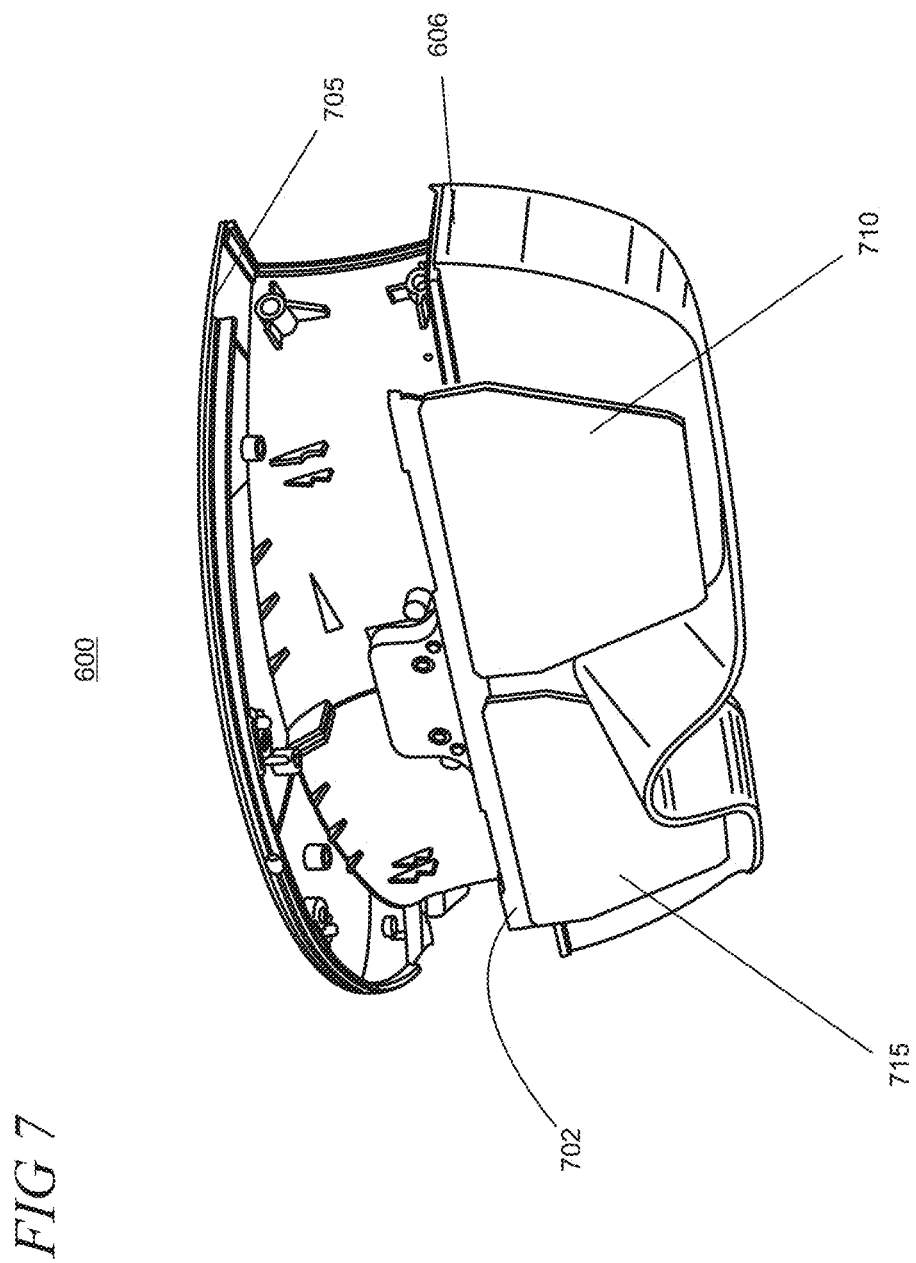
FIG. 7 shows a partially disassembled view of the sealed visor.

As shown in FIG. 7, the rear shield 606 is configured in an ergonomically suitable form to interface with the user's nose, and nose pads and/or other comfort features can be included (e.g., molded-in and/or added-on as discrete components). The sealed visor 600 can also incorporate some level of optical diopter curvature (i.e., eye prescription) within the molded shields in some cases.

Figure 8:
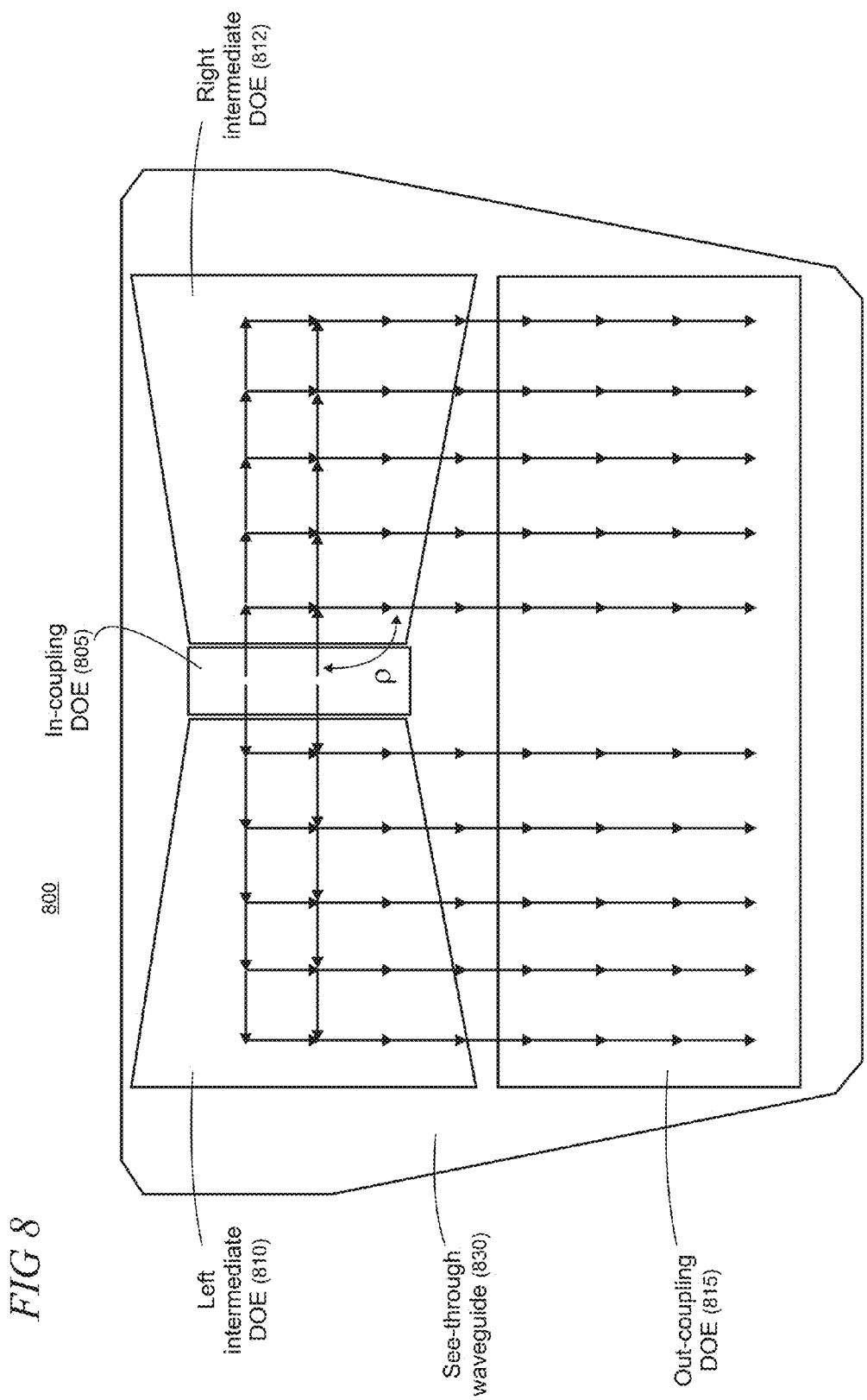
FIG. 8 shows an illustrative arrangement of four diffractive optical elements (DOEs) configured for in-coupling, exit pupil expansion in two directions, and out-coupling.

FIG. 8 shows an illustrative waveguide display 800 having four DOEs that may be used with, or incorporated as a part of, a see-through waveguide 830 to provide in-coupling, expansion of the exit pupil in two directions, and out-coupling. The waveguide display 800 may be utilized in an exit pupil expander that is included in the near eye display system 702 (FIG. 7) to provide virtual world images to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating, as described in more detail below in the text accompanying FIGS. 9-14.

The waveguide display 800 includes an in-coupling DOE 805, an out-coupling DOE 815, and left and right intermediate DOEs 810 and 812 that couple light between the in-coupling and out-coupling DOEs. The in-coupling DOE 805 is configured to couple image light comprising one or more imaging beams from an imager 105 (FIG. 1) into the waveguide. The intermediate DOEs 810 and 812 expand the exit pupil in a first direction along a first coordinate axis, and the out-coupling DOE 815 expands the exit pupil in a second direction along a second coordinate axis and couples light out of the waveguide to the user's eye. The angle ρ is a rotation angle between the periodic lines of the in-coupling DOE 805 and the right intermediate DOE 812 as shown. As the light propagates in the right intermediate DOE 812 (horizontally from left to right in the drawing), it is also diffracted (in the downward direction) to the out-coupling DOE 815. As the light propagates in the left intermediate DOE 810 (horizontally from right to left in the drawing), it is also diffracted (in the downward direction) to the out-coupling DOE 815.

While four DOEs are shown in this illustrative example in which a central in-coupling DOE is disposed between the two intermediate DOEs above the out-coupling DOE, in some implementations a single intermediate DOE may be utilized. In this case, the in-coupling DOE may be laterally positioned within the waveguide along a side of the intermediate DOE. The single intermediate DOE and out-coupling DOE in the arrangement of three DOEs are configured to provide exit pupil expansion in two directions in a similar manner to the four DOE arrangement. It may be appreciated that other numbers and arrangements of DOEs may be utilized to meet the needs of a particular implementation.

Figure 9:
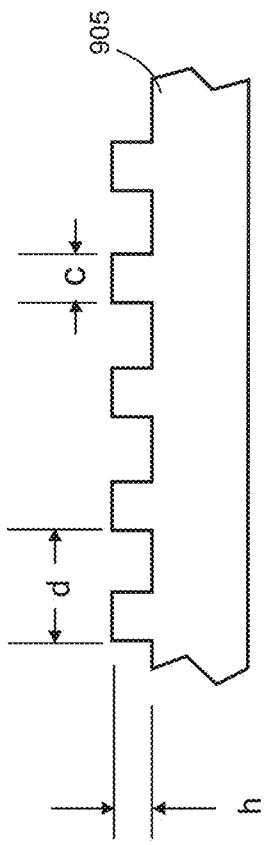
FIG. 9 shows a profile of a portion of an illustrative diffraction grating that has straight gratings.
Figure 10:
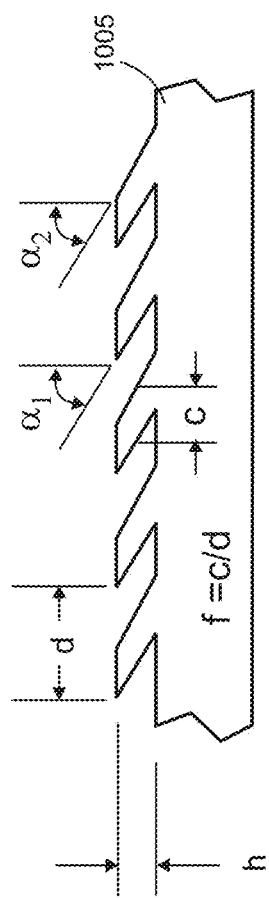
FIG. 10 shows a profile of a portion of an illustrative diffraction grating that has asymmetric or slanted gratings.

The grating features used in the DOEs in the waveguide display 800 (FIG. 8) can take various suitable forms. For example, FIG. 9 shows a profile of straight (i.e., non-slanted) grating features 900 (referred to as grating bars, grating lines, or simply "gratings"), that are formed in a substrate 905 in 1D and 2D grating arrangements. By comparison, FIG. 10 shows grating features 1000 formed in a substrate 1005 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles, for example to support polarization-sensitive Bragg gratings and other structures. In FIGS. 9 and 10, the grating period is represented by d, the grating height by h, the bar width by c, and the filling factor by f, where f=c/d. The slanted gratings in FIG. 10 may be described by slant angles $\alpha_1$ and $\alpha_2$.

FIGS. 11-14 show various illustrative 2D diffraction gratings which may be utilized to impart polarization sensitivity to the in-coupling DOE as discussed in the illustrative embodiment shown in FIGS. 26 and 27. The 2D gratings in the FIGS. 11-14 are intended to be illustrative and not limiting, and it is contemplated that variations from the 2D gratings shown may also be utilized. Gratings may include symmetric and/or asymmetric features including slanted gratings (i.e., gratings having walls that are non-orthogonal according to one or more predetermined angles to a plane of the waveguide) and blazed gratings (i.e., gratings having asymmetric triangular or sawtooth profiles) in some cases. Various suitable surface relief contours, filling factors, grating periods, and grating dimensions can also be utilized to meet the needs of a particular implementation.

Figure 12:
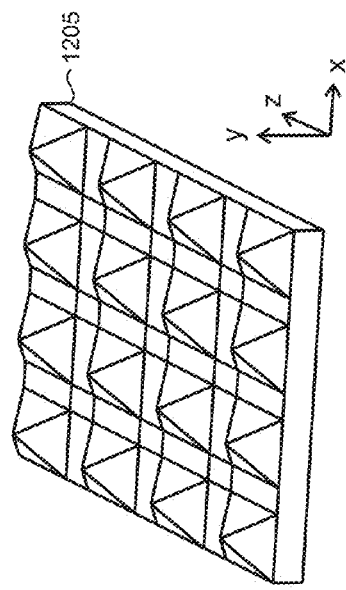
FIGS. 11-14 show various illustrative two-dimensional diffraction gratings.
Figure 14:
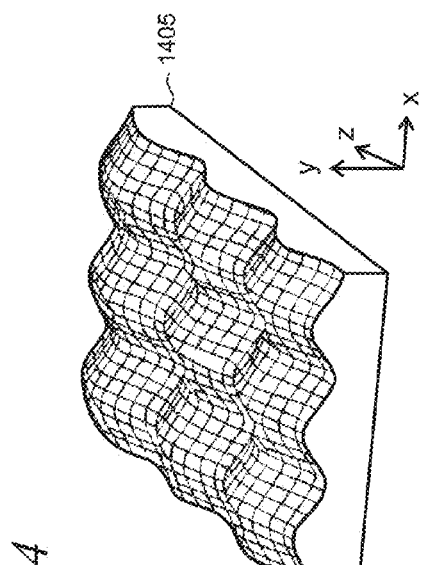
Figure 11:
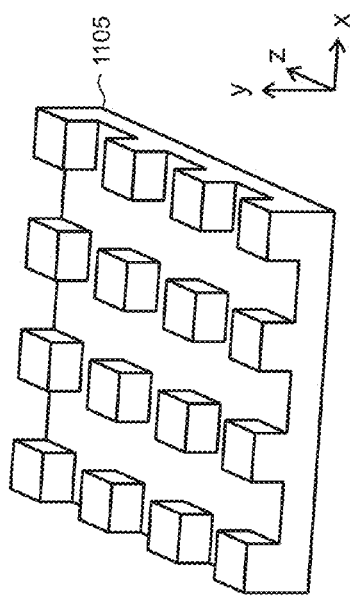
Figure 13:
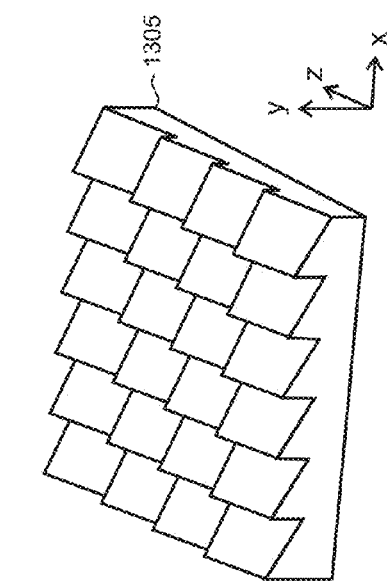

FIG. 11 shows a 2D grating 1105 that includes quadrangular elements that project from a substrate. The quadrangular elements can also be configured to be asymmetric such as being slanted or blazed. Non-quadrangular three-dimensional geometries (both symmetric and asymmetric) may also be utilized for a 2D grating including, for example, cylindrical elements, polygonal elements, elliptical elements, or the like. For example, FIG. 12 shows a 2D grating 1205 that includes pyramidal elements, and FIG. 13 shows a 2D grating 1305 that includes elements that have a blazed profile in each of the x and z directions. Gratings may also have elements with curved profiles, as shown in the illustrative 2D grating 1405 in FIG. 14.

Figure 15:
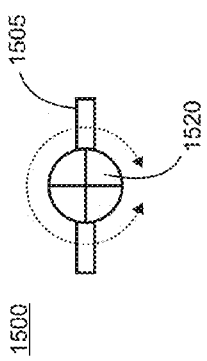
FIGS. 15, 16, and 17 show side and top views of an illustrative MEMS (Micro Electro Mechanical System) scanner.
Figure 16:
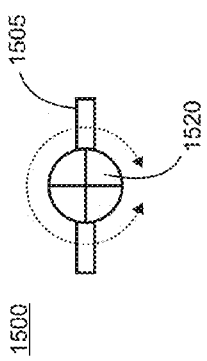
Figure 17:
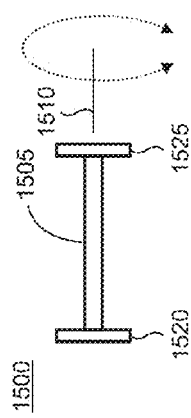

FIGS. 15, 16, and 17 show respective simplified side and top views of an illustrative MEMS (Micro Electro Mechanical System) device 1500 that includes a scanning plate 1505 configured to scan one or more beams that comprise image light for virtual images. The MEMS device 1500 is often referred to as a MEMS scanner or beam deflector. The scanning plate 1505 comprises a reflective surface (e.g., mirror) that is used to scan an impinging beam over an FOV which is movably suspended to one or more structures (not shown) in a MEMS device using lateral torsional flexures 1520 and 1525, or other suitable arrangements such as bending flexures. The reflective surface may include a plated reflective metal such as gold or aluminum, a dielectric stack, bare silicon, or other materials depending upon wavelength and other design criteria. The scanning plate 1505 may be configured with a rectangular footprint as shown in FIG. 17, although circular or oval footprints may also be utilized in some applications as indicated by the dashed line 1508.

Various actuation technologies (not shown in the drawings) for MEMS scanners may be utilized depending on the needs of a particular implementation. Electrocapacitive drive scanners include both rear drive pad and comb drive architectures. Magnetic drive scanners include moving coil and moving magnet types. Other technologies include thermal, piezoelectric, and impact motor drives. Electrocapacitive drive systems may be referred to as electrostatic and bending flexures may be referred to as cantilever arms. MEMS scanners may be operated non-resonantly, and resonantly in some cases which may reduce power consumption.

In this example, the MEMS scanners are configured as single axis (i.e., 1D) scanners that are operated in pairs to provide 2D scanning whereby the axes of rotation, indicated by reference numeral 1510, are positioned to be at substantially right angles to each other. One MEMS scanner in the pair is operated to perform a fast scan, while the other is operated to perform a slow scan. Typically, the fast scan MEMS scanner sweeps back and forth horizontally across the FOV while the slow scan MEMS scanner indexes down the FOV by one or two lines. Such systems may be termed progressive scan systems in which the beams of image light may be scanned unidirectionally or bidirectionally depending upon the desired resolution, frame rate, and scanner capabilities.

The fast scan MEMS scanner generally operates at a relatively high scan rate while the slow scan MEMS scanner operates at a scan rate equal to the video frame rate. In some applications, the fast scan MEMS scanner operates resonantly while the slow scan MEMS scanner provides a substantially sawtooth pattern, scanning progressively down the frame for a portion of a frame and then flying back to the top of the frame to start over. In other applications, interleaved sawtooth scanning, triangular wave scanning, sinusoidal scanning, and other waveforms are used to drive one or both axes.

Depending on application requirements, the fast scan direction can be horizontal (rotating about a vertical scan axis) and a slow scan direction can be vertical (rotating about a horizontal scan axis). However, such convention is not limiting and some embodiments of the present compact display engine with MEMS scanners may be implemented with fast and slow scans in the vertical and horizontal directions, respectively, as described below, as well as other directions.

Figure 18:
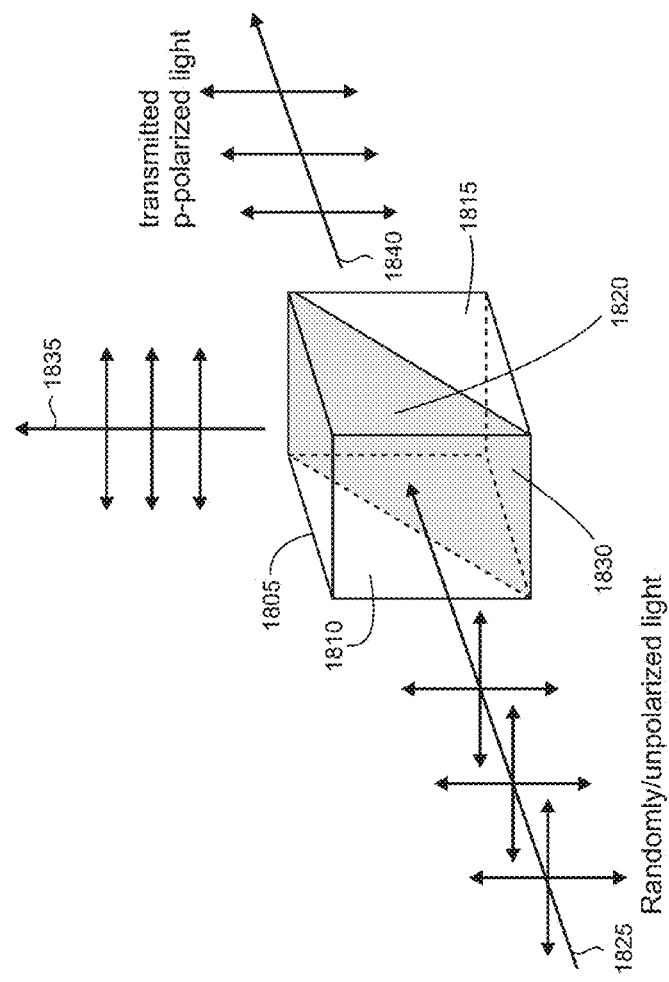
FIG. 18 shows an illustrative polarizing beam splitter (PBS) cube.

FIG. 18 shows an illustrative polarizing beam splitter (PBS) cube 1805 that comprises two right angle prisms 1810 and 1815 which are joined at a planar interface 1820 defined by each prism's hypotenuse. The PBS cube is configured as a hexahedron in typical implementations with square faces, however other configurations such as rhomboid prisms (i.e., lateral displacement beam splitters) can also be utilized in some implementations. Other beam splitting devices may be alternatively utilized including, for example, plate beam splitters, wire grid beam splitters, diffraction grating beam splitters, and other suitable beam splitters.

The interface between the prisms (referred to here as a "beam splitter interface") is configured to be polarization-sensitive using, for example, a dielectric beam splitter coating that can reflect and transmit a portion of an incident light beam. When an incoming randomly polarized or unpolarized beam 1825 is incident on the entrance face 1830, the PBS cube splits the beam into two orthogonal, linearly polarized components including an s-polarized component and a p-polarized component (s-polarized light is also referred to as TE (transverse electric), and p-polarized as TM (transverse magnetic)). S-polarized light 1835 is reflected at a 90-degree angle with respect to the incident beam 1825 while p-polarized light 1840 is transmitted through the PBS cube without being altered. That is, the PBS cube provides a 90-degree separation between the reflected and transmitted beams. In some implementations, one or more of the four entrance/exit faces of the PBS cube may be coated with an antireflection coating to minimize back reflections.

Figure 19:
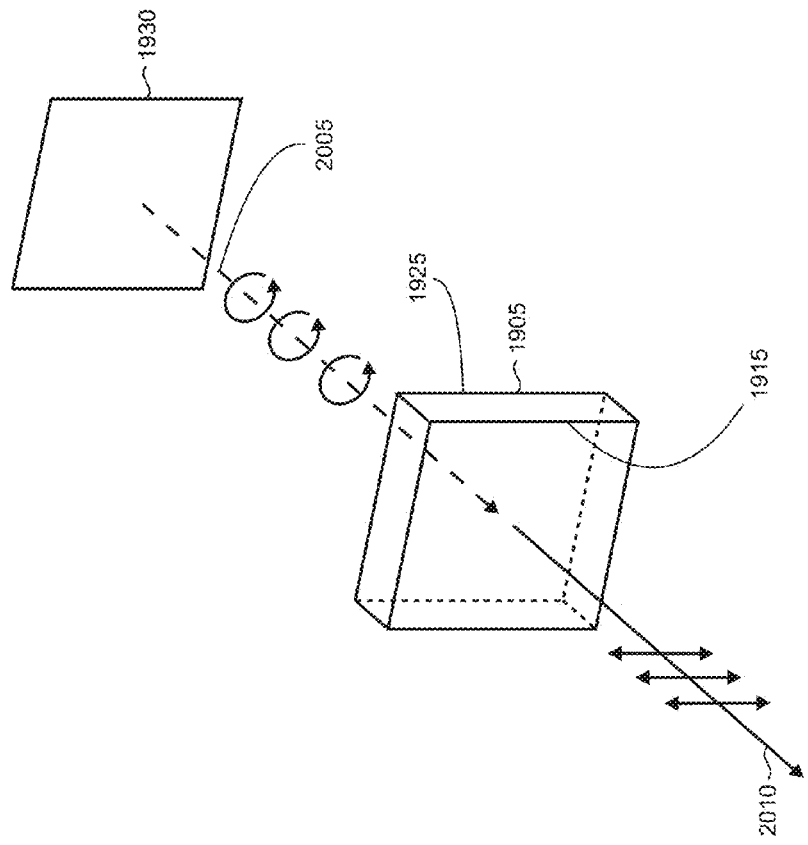
FIGS. 19 and 20 show an illustrative quarter wave plate.
Figure 20:
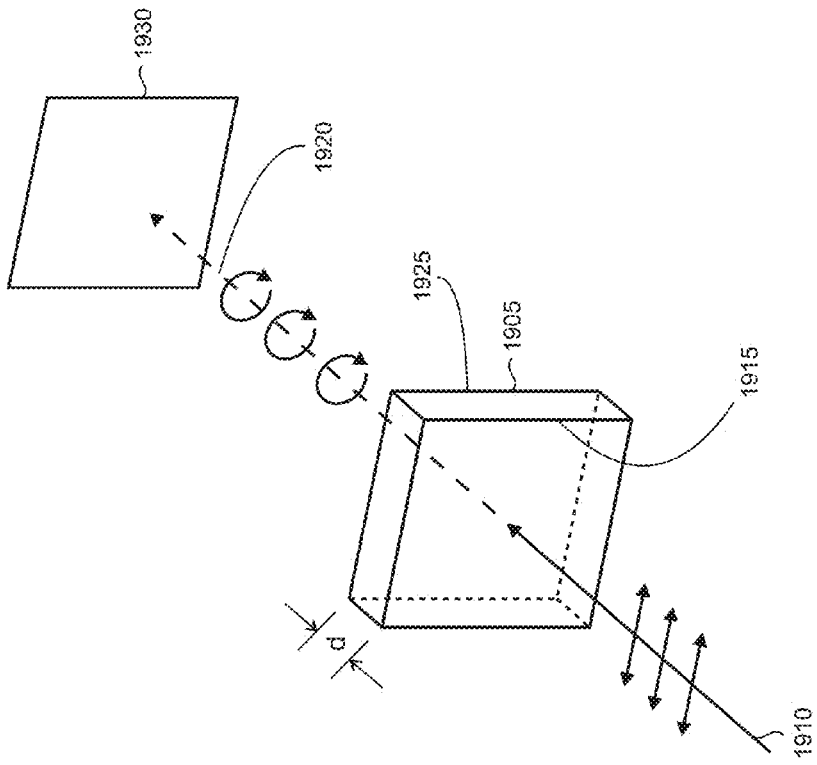

FIGS. 19 and 20 show an illustrative quarter wave plate 1905 that comprises a slab of birefringent material having thickness, d. Quarter wave plates are also referred to as birefringent wave plates or retarders. The quarter wave plate is configured so that the optical axis is parallel to the front and rear faces and includes fast and slow axes which are orthogonal to each other as well as to the light beam propagation direction.

The velocities of extraordinary and ordinary rays through the birefringent materials vary inversely with their refractive indices. The difference in velocities gives rise to a phase difference when the two rays recombine. In the case of an incident linearly polarized beam this is given by $\alpha=2\pi d(n_e-n_o)/\lambda$ where $\alpha$ is the phase difference; $n_e$ and $n_o$ are refractive indices of extraordinary and ordinary rays respectively; and $\lambda$ is wavelength. Accordingly, at any specific wavelength the phase difference is governed by the thickness, d, of the wave plate 1905. The quarter wave plate provides a phase difference of $\pi/2$ which corresponds to a propagation shift of $\lambda/4$ (thus the name "quarter wave plate").

A linearly polarized beam 1910 incident on the front face 1915 of the quarter wave plate 1905 changes to a circularly polarized beam 1920 upon exit from the opposite back face 1925. In this example, the input beam 1910 is s-polarized in the horizontal plane and the fast and slow axes of the quarter wave plate are positioned diagonally in the plate. That is, the plane of the incident light makes a 45-degree angle with the optical axis of the quarter wave plate.

As shown in FIG. 20, when the exiting beam impinges on a reflective surface 1930 (such as the reflective scanning plate in a MEMS scanner), it is reflected in a backward propagating circularly polarized beam 2005 towards the quarter wave plate 1905. The backward propagating circularly polarized beam 2005 impinges on the back face of the quarter wave plate where it changes to a linearly polarized beam 2010. Beam 2010 exits from the front face with an opposite polarization state to that of the impinging beam on the front face. In this example, the exiting beam 2010 is p-polarized. Thus, when a linearly polarized beam makes two passes through the quarter wave plate—one pass in the forward propagating direction and the second in the backward propagating direction—its state of polarization changes to the orthogonal state of polarization (e.g., from s-polarized to p-polarized or vice versa).

Figure 21:
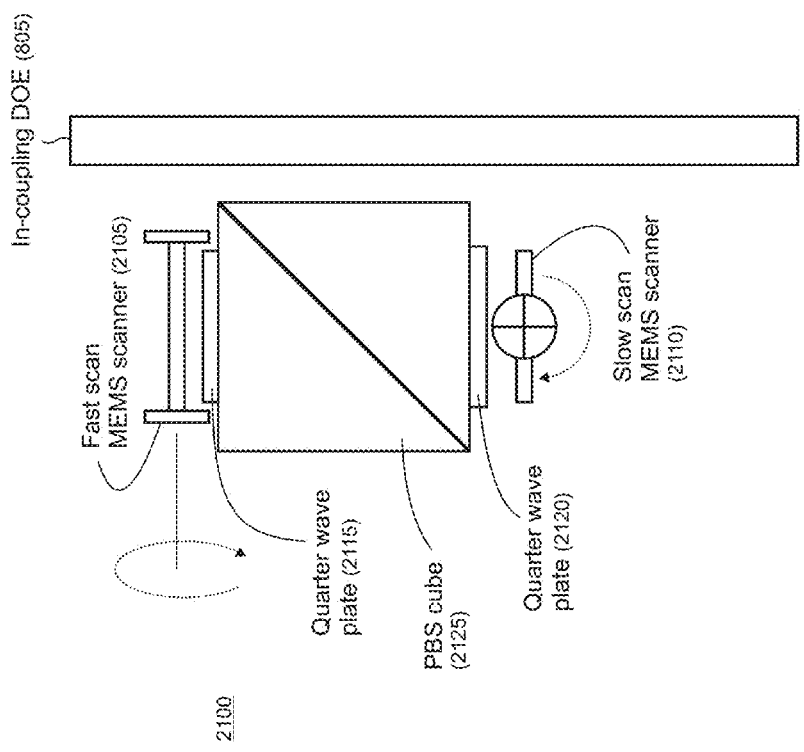

FIG. 21 shows a first illustrative embodiment of a compact display engine 2100 that comprises a pair of MEMS scanners, including a fast scan MEMS scanner 2105 and a slow scan MEMS scanner 2110, and a respective pair of adjacent quarter wave plates, including a top quarter wave plate 2115 and a bottom quarter wave plate 2120 that are disposed about a PBS cube 2125. The PBS cube is configured to reflect linearly polarized light in a first polarization state and transmit linearly polarized light in a second polarization state that is orthogonal to the first state. For example, the first polarization state may be s-polarized and the second polarization state may be p-polarized.

The display engine 2100 is located adjacent to the in-coupling DOE 805 of a waveguide display (e.g., waveguide display 800 shown in FIG. 8 and described in the accompanying text). In this embodiment, the fast scan MEMS scanner is located at the top face of the PBS cube 2125 and the slow scan MEMS scanner is located at the bottom face of the PBS cube. The MEMS scanners are oriented with orthogonal scanning axes, as shown.

In this illustrative embodiment and the others described below, it may be appreciated that the fast scan and slow scan MEMS scanners are arranged in the display engine in a manner that produces image light that is coupled into the waveguide display with an FOV that is rotated compared to some conventional raster scanning arrangements. That is, the vertical and horizontal axes are switched compared to some conventional systems. Compensation for such FOV rotation in the waveguide display may be provided, for example, by corresponding changes in the virtual images as they are produced prior to rendering and display.

As shown in FIG. 22, image light 2205 from an imager (e.g., imager 105 in FIG. 1) impinges on an entrance face 2210 of the PBS cube 2125. The image light in this example comprises laser light using one or more beams which may cover the expanse of a given FOV. The image light is polarized in the first state. In some implementations, the light from the laser is inherently linearly polarized and the polarization is controlled through alignment of the imager with respect to the display engine, or using a polarization rotator or other suitable device. In other implementations, the image light may be transmitted through a polarizing filter.

The beam splitter interface 2215 of the PBS cube 2125 is oriented at a 45-degree angle in a vertical plane to the direction of propagation of the image light. The beam splitter interface thus reflects the incident image light upwards (i.e., orthogonally to the incident image light) to the top quarter wave plate 2115 and fast scan MEMS scanner 2105.

As shown in FIG. 23, the fast scan MEMS scanner reflects the image light downwards back to the PBS cube. The image light reflected by the beam splitter interface 2215 makes two passes through the top quarter wave plate 2115—one pass upward to the fast scan MEMS scanner 2105 and one pass downward when reflected from the fast scan MEMS scanner—and thus changes to a second polarization state. The image light in the second polarization state passes through the PBS cube 2125, without being reflected at the beam splitter interface 2215, to the slow scan MEMS scanner 2110 at the bottom face of the PBS cube.

The slow scan MEMS scanner 2110 reflects the image light upwards back to the PBS cube. The state of polarization changes back to the first state as the image light makes two passes through the bottom quarter wave plate 2120. The beam splitter interface 2215 reflects the image light in the first polarization state out of the cube at the exit face 2305 and into the in-coupling DOE 805 to thereby couple the image light from the imager into the waveguide display.

In the first illustrative embodiment, as shown in FIGS. 22 and 23, the image light propagates orthogonally to the plane of the in-coupling DOE 805. While this arrangement may be advantageous in some applications to optimize packaging and other design considerations, it can present a risk that high intensity laser light may enter the in-coupling DOE or other portions of the waveguide display. Such stray image light in the waveguide display can result in suboptimal image quality in some cases and may result in less efficient energy utilization in a given device.

Figure 25:
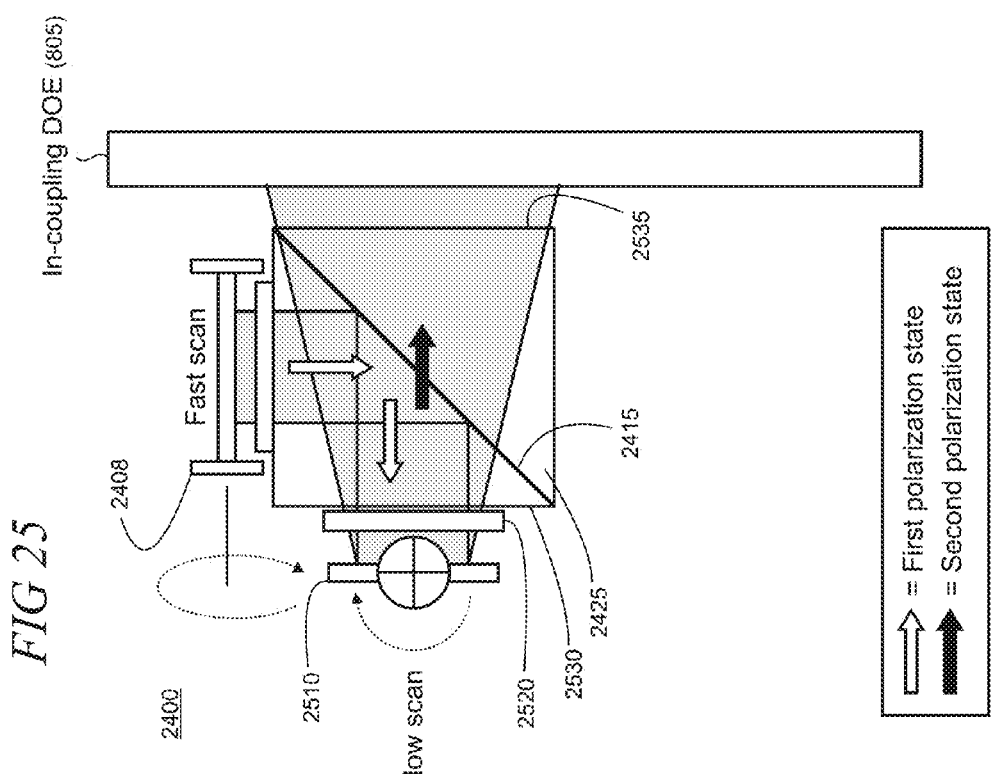
FIGS. 24 and 25 show a second illustrative embodiment of a compact display engine using MEMS scanners.
Figure 24:
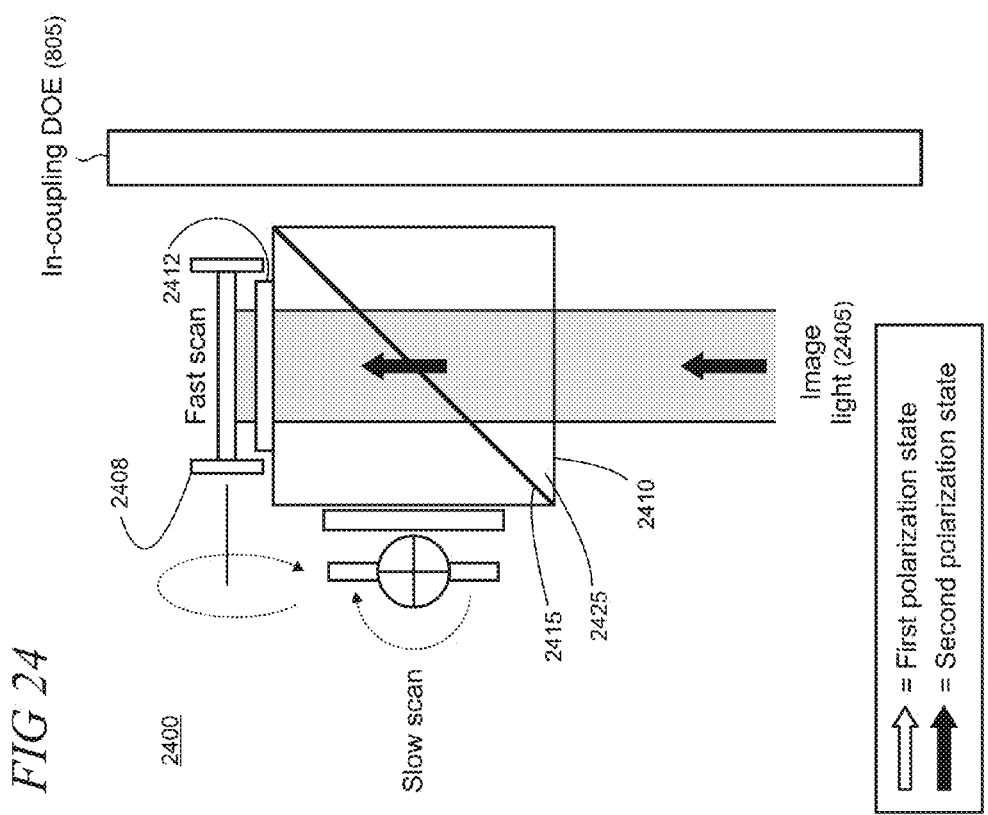

In a second illustrative embodiment of a display engine 2400 shown in FIGS. 24 and 25, image light 2405 in a second polarization state is incident on an entrance face 2410 at the bottom of a PBS cube 2425. The image light thus enters the PBS cube in a direction that is parallel to the plane of the in-coupling DOE 805. As in the first embodiment, the beam splitter interface 2415 of the PBS cube in this second embodiment is configured to be sensitive to the first polarization state. Accordingly, the image light is not reflected at the beam splitter interface, and instead is transmitted through the PBS cube to the top quarter wave plate 2412 and fast scan MEMS scanner 2408 located at the top face of the cube opposite the entrance face.

As shown in FIG. 25, the fast scan MEMS scanner 2408 reflects the light downward through the PBS cube 2425. As the reflected image light has made two passes through the top quarter wave plate 2412—one pass upwards and one pass downwards—it is changed to the first polarization state (i.e., orthogonal to the second polarization state). The beam splitter interface 2415, being sensitive to the first polarization state, reflects the image light horizontally to the slow scan MEMS scanner 2510 and side quarter wave plate 2520 on the side face 2530 of the PBS cube opposite the exit face 2535.

The slow scan MEMS scanner 2510 reflects the image light back towards the PBS cube. As the reflected image light has made two passes through the side quarter wave plate 2520, it is changed back to the second polarization state and thereby passes through the PBS cube without being reflected at the beam splitter interface 2415. The image light exiting the PBS cube at the exit face 2535 is coupled into the waveguide display by the in-coupling DOE 805.

FIGS. 26, 27, and 28 show a third illustrative embodiment of a display engine 2600 which may provide for additional packaging flexibility and/or space savings in some implementations. In this embodiment, the in-coupling DOE 805 is configured with polarization sensitivity to the first polarization state, for example, using a Bragg grating and/or two-dimensional grating structure, as described above in the text accompanying FIGS. 9-14. The in-coupling DOE 805 is located between the exit face 2635 of a PBS cube 2625 and a slow scan MEMS scanner 2610 and associated quarter wave plate 2620. A fast scan MEMS scanner 2608 and associated quarter wave plate 2615 are located at a side face 2630 of the PBS cube that is opposite to the exit face 2635.

Image light 2605 in a first polarization state propagates in a direction that is parallel to the plane of the in-coupling DOE 805. In this embodiment, the image light enters the top face 2632 of the PBS cube 2625. The beam splitter interface 2618 of the PBS cube is configured with sensitivity to the first polarization state and therefore reflects the image light horizontally to the side quarter wave plate 2620 and fast scan MEMS scanner 2608.

As shown in FIG. 27, the fast scan MEMS scanner 2608 reflects the image light back to the PBS cube 2625. The polarization state of the image light reflected from the fast scan MEMS scanner 2608 is changed to the second polarization state (i.e., orthogonal to the first polarization state) because it has made two passes through the side quarter wave plate 2615. As the in-coupling DOE 805 is sensitive to the first polarization state, the reflected image light in the second polarization state is transmitted, through the in-coupling DOE without being in-coupled to the waveguide, to the quarter wave plate 2615 and slow scan MEMS scanner 2610 on the exit side of the in-coupling DOE 805.

As shown in the enlarged view in FIG. 28, the slow scan MEMS scanner 2610 reflects the image light back to in-coupling DOE 805. As the light reflected from the slow scan MEMS scanner has made two passes through the quarter wave plate 2620, its state is changed to the first polarization state. The in-coupling DOE, being sensitive to the first polarization state, couples the image light impinging on the backside of the DOE into the waveguide display.

Figure 30:
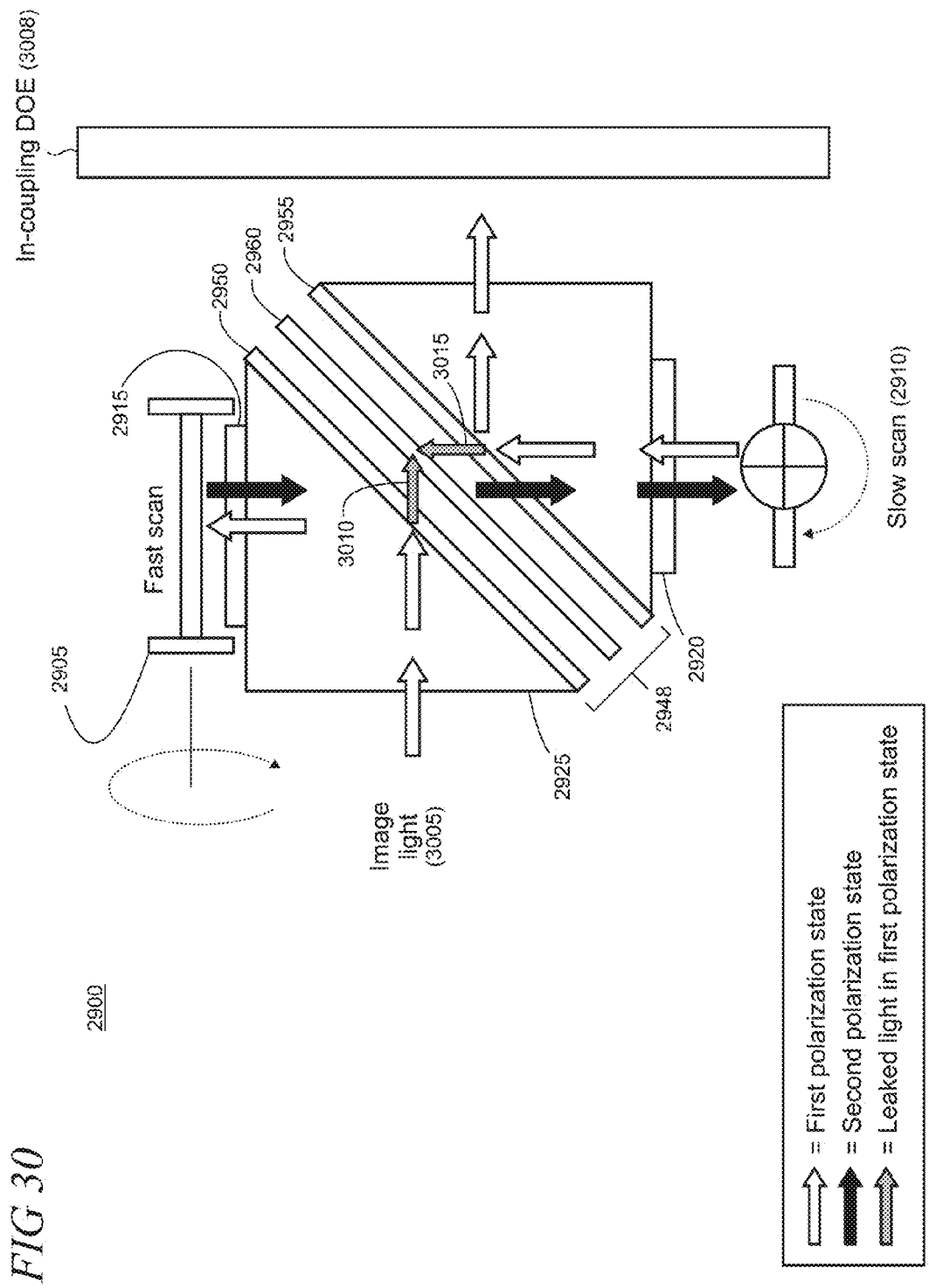

FIGS. 29 and 30 show a fourth illustrative embodiment of a display engine 2900 in which a PBS cube 2925 is arranged with an optical stack 2948 that comprises two PBS layers 2950 and 2955 (e.g., coatings) that are located on either side of an absorptive polarizer 2960. The absorptive polarizer is polarization sensitive (e.g., absorbs/attenuates s-polarized light). The stack 2948 is shown in an exploded view for sake of clarity in exposition in FIGS. 29 and 30. A fast scan MEMS scanner 2905 and quarter wave plate 2915 are disposed at the top of PBS cube 2925 and a slow scan MEMS scanner 2910 and quarter wave plate 2920 are disposed at the bottom of the PBS cube.

As shown in FIG. 30, image light 3005 in a first polarization state (e.g., s-polarized) enters the PBS cube 2925 and is reflected by the first PBS layer 2950 upwards to the fast scan MEMS scanner 2905. Image light which may leak through the first PBS layer (as indicated by arrow 3010) can be attenuated by the absorptive polarizer layer 2960. The light reflected by the first PBS layer travels upward to the fast scan MEMS scanner where it is reflected toward the slow scan MEMS scanner 2910. As the light makes two passes through the top quarter wave plate 2915, it changes to the orthogonal p-polarization state and is passed by the first and second PBS layers 2950 and 2955.

Image light reflected upward by the slow scan MEMS scanner 2910 is changed back to s-polarized by virtue of its two passes through the bottom quarter wave plate 2920. The second PBS layer 2955 reflects the image light to the in-coupling DOE 3008. Image light which may leak through the second PBS layer (as indicated by arrow 3015) can be attenuated by the absorptive polarizer layer 2960.

The PBS cube 2925 with the optical stack 2948 may be useful in some implementations to reduce unscanned light leaking into the waveguide display which may cause ghosting and reduce overall image quality. Typically, the PBS coatings 2950 and 2955 and the absorptive polarizer have extinction ratios exceeding 1000 to 1. Accordingly, as the s-polarized image light makes multiple passes through the PBS coatings and absorptive polarizer, the intensity of the leakage into the waveguide display may be significantly reduced (i.e., by six orders of magnitude). In some cases, the absorptive polarizer can be doubled up in the PBS cube to provide additional control over light leakage.

Figure 31:
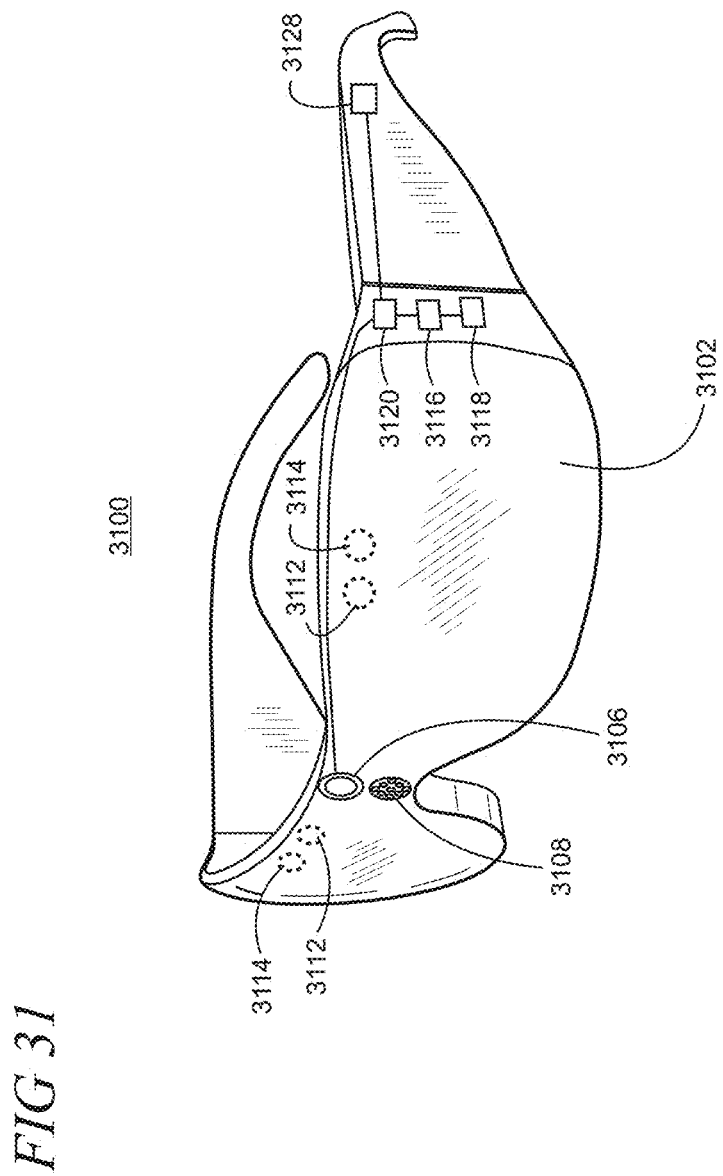
FIG. 31 is a pictorial view of an illustrative example of a virtual reality or augmented reality HMD device that may use a compact display engine with MEMS scanners.
Figure 32:
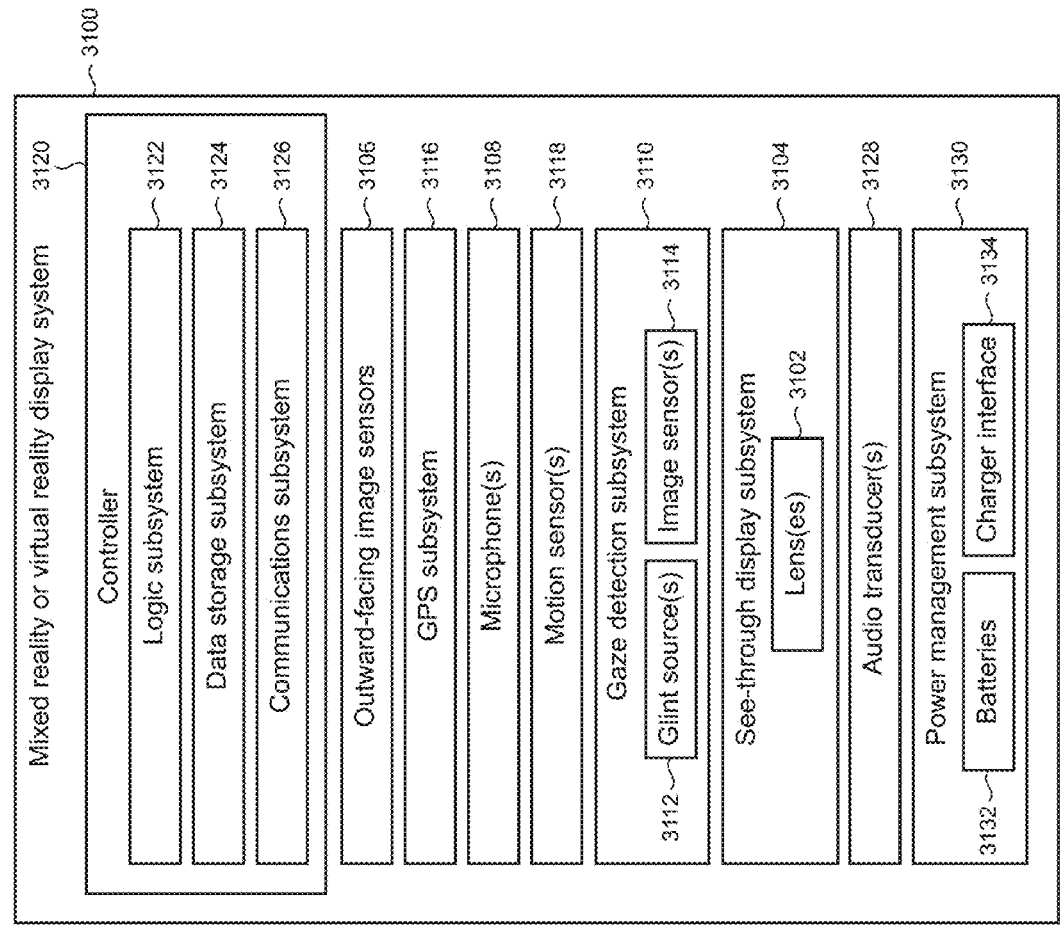
FIG. 32 shows a block diagram of an illustrative example of a virtual reality or augmented reality HMD device that may use a compact display engine with MEMS scanners.

Each embodiment of the display engine described above may be utilized in mixed-reality or virtual-reality applications. FIG. 31 shows one particular illustrative example of a mixed-reality or virtual-reality HMD device 3100, and FIG. 32 shows a functional block diagram of the device 3100. HMD device 3100 comprises one or more lenses 3102 that form a part of a see-through display subsystem 3104, so that images may be displayed using lenses 3102 (e.g. using projection onto lenses 3102, one or more waveguide systems, such as a near-eye optical display system, incorporated into the lenses 3102, and/or in any other suitable manner). HMD device 3100 further comprises one or more outward-facing image sensors 3106 configured to acquire images of a background scene and/or physical environment being viewed by a user, and may include one or more microphones 3108 configured to detect sounds, such as voice commands from a user. Outward-facing image sensors 3106 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 3100 may further include a gaze detection subsystem 3110 configured for detecting a direction of gaze of each eye of a user or a direction or location of focus, as described above. Gaze detection subsystem 3110 may be configured to determine gaze directions of each of a user's eyes in any suitable manner. For example, in the illustrative example shown, a gaze detection subsystem 3110 includes one or more glint sources 3112, such as infrared light sources, that are configured to cause a glint of light to reflect from each eyeball of a user, and one or more image sensors 3114, such as inward-facing sensors, that are configured to capture an image of each eyeball of the user. Changes in the glints from the user's eyeballs and/or a location of a user's pupil, as determined from image data gathered using the image sensor(s) 3114, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 3110 may have any suitable number and arrangement of light sources and image sensors. In some implementations, the gaze detection subsystem 3110 may be omitted.

The HMD device 3100 may also include additional sensors. For example, HMD device 3100 may comprise a global positioning system (GPS) subsystem 3116 to allow a location of the HMD device 3100 to be determined. This may help to identify real-world objects, such as buildings, etc. that may be located in the user's adjoining physical environment.

The HMD device 3100 may further include one or more motion sensors 3118 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 3106. The use of motion data may allow changes in gaze direction to be tracked even if image data from outward-facing image sensor(s) 3106 cannot be resolved.

In addition, motion sensors 3118, as well as microphone(s) 3108 and gaze detection subsystem 3110, also may be employed as user input devices, such that a user may interact with the HMD device 3100 via gestures of the eye, neck and/or head, as well as via verbal commands in some cases. It may be understood that sensors illustrated in FIGS. 31 and 32 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 3100 can further include a controller 3120 such as one or more processors having a logic subsystem 3122 and a data storage subsystem 3124 in communication with the sensors, gaze detection subsystem 3110, display subsystem 3104, and/or other components through a communications subsystem 3126. The communications subsystem 3126 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 3124 may include instructions stored thereon that are executable by logic subsystem 3122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 3100 is configured with one or more audio transducers 3128 (e.g., speakers, earphones, etc.) so that audio can be utilized as part of a mixed reality or virtual reality experience. A power management subsystem 3130 may include one or more batteries 3132 and/or protection circuit modules (PCMs) and an associated charger interface 3134 and/or remote power interface for supplying power to components in the HMD device 3100.

It may be appreciated that the HMD device 3100 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 33:
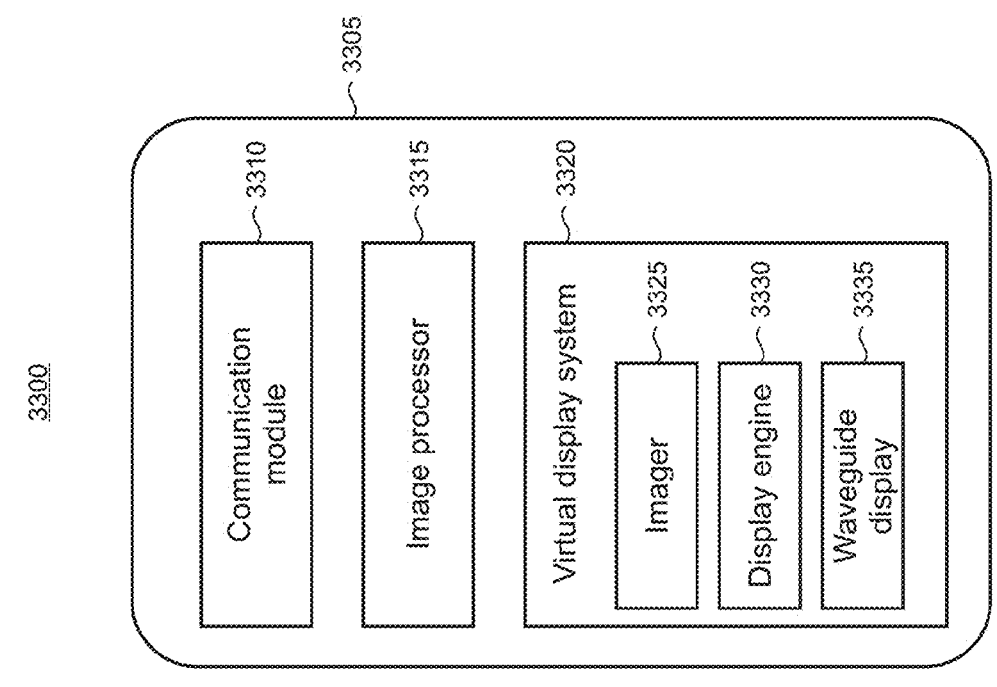
FIG. 33 shows a block diagram of an illustrative electronic device that incorporates an augmented reality display system that may use a compact display engine with MEMS scanners.

As shown in FIG. 33, the compact display engine with MEMS scanners can be used in a mobile or portable electronic device 3300, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 3300 includes a housing 3305 to house a communication module 3310 for receiving and transmitting information from and to an external device, or a remote system or service (not shown).

The portable device 3300 may also include an image processor 3315 using one or more processors for handling the received and transmitted information, and a virtual display system 3320 to support viewing of images. The virtual display system 3320 can include a micro-display or an imager 3325, a display engine 3330 and a waveguide display 3335. The image processor 3315 may be operatively connected to the imager 3325 to provide image data, such as video data so that images may be displayed using the display engine 3330 and waveguide display 3335. An EPE may be included in the waveguide display 3335.

Various exemplary embodiments of the present compact display engine with MEMS scanners are now presented by way of illustration and not as an exhaustive list of all embodiments. An example includes a near-eye optical display system configured to show images within a field of view (FOV) described by a first direction and a second direction, comprising: a waveguide display comprising one or more diffractive optical elements (DOEs) including an in-coupling DOE configured for in-coupling image light to the waveguide display; a polarizing beam splitter located proximate to the in-coupling DOE, the polarizing beam splitter configured to reflect image light having a first polarization state and transmit image light having a second polarization state; a first MEMS (micro electro mechanical system) scanner and configured to scan in the first direction of the FOV; a first quarter wave plate having an optical axis that is parallel to front and rear faces of the first quarter wave plate, the first MEMS scanner being disposed proximate to the front face and the polarizing beam splitter being disposed proximate to the rear face; a second MEMS scanner configured to scan in the second direction of the FOV; and a second quarter wave plate having an optical axis that is parallel to front and rear faces of the second quarter wave plate, the second MEMS scanner being disposed proximate to the front face and the polarizing beam splitter being disposed proximate to the rear face, wherein image light from an imager incident on the polarizing beam splitter propagates to each of the first and second MEMS scanners in succession so that the image light exits the polarizing beam splitter and is in-coupled into the waveguide display over the extent of the FOV as the first and second MEMS scanners are operated.

In another example, the FOV is rectangular and each of the first and second MEMS scanners have a single scanning axis, and the single scanning axis of the first MEMS scanner is orthogonal to the single scanning axis of the second MEMS scanner, and the first and second MEMS scanners are operated to perform raster scanning. In another example, the waveguide display further includes at least one intermediate DOE and an out-coupling DOE, wherein the one intermediate DOE provides exit pupil expansion in a first direction of the FOV and the out-coupling DOE provides exit pupil expansion in the second direction of the FOV. In another example, a propagation path of the image light in the near-eye optical display system includes two passes through each of the first and second quarter wave plates and the image light changes its state of polarization after completion of each of the two passes. In another example, the image light is polarized in the first polarization state when incident on the polarizing beam splitter. In another example, one or more of the first and second MEMS scanners are operated resonantly.

A further example includes a head mounted display (HMD) device configured to display images within a field of view (FOV) having first and second directions, comprising: a polarization beam splitter (PBS) cube having twelve edges and six faces including an entrance face and an exit face, the entrance and exit faces sharing a common edge, the PBS cube configured to reflect propagating image light having a first polarization state orthogonally to a direction of propagation and further configured to transmit image light having a second polarization state parallel to the direction of propagation; an in-coupling diffractive optical element (DOE) in a waveguide display that provides exit pupil expansion in the first and second directions of the FOV, the in-coupling DOE located adjacent to the exit face of the PBS cube; a first quarter wave plate located adjacent to a face of the PBS cube that is opposite the entrance face; a second quarter wave plate located adjacent to a face of the PBS cube that is opposite the exit face; a first MEMS (micro electro mechanical system) scanner having a reflective scanning plate and configured to scan in the first direction of the FOV, the first MEMS scanner located adjacent to the first quarter wave plate; and a second MEMS scanner having a reflective scanning plate and configured to scan in the second direction of the FOV, the second MEMS scanner located adjacent to the second quarter wave plate.

In another example, image light entering the entrance face passes through the PBS cube, makes a first pass through the first quarter wave plate, is reflected by the first MEMS scanner, makes a second pass through the first quarter wave plate, is reflected by the PBS cube towards the face opposite the exit face, makes a first pass through the second quarter wave plate, is reflected by the second MEMS scanner towards the exit face, makes a second pass through the second quarter wave plate, is passed through the PBS cube, exits the exit face to be in-coupled by the in-coupling DOE to the waveguide display. In another example, the image light is generated by an imager comprising one or more lasers and the image light is in the second state of polarization when incident upon the entrance face of the PBS cube. In another example, the first and second MEMS scanners are operated in combination to provide raster scanning through a fast axis and a slow axis. In another example, the waveguide display includes at least one intermediate DOE configured to provide exit pupil expansion in the first direction and at least one out-coupling DOE configured to provide exit pupil expansion in the second direction and out-couple the image light from the waveguide display to an eye of an HMD device user. In another example, the image light enters the entrance face of the PBS cube in a direction that is parallel to a plane of the in-coupling DOE.

A further example includes a device configured to control image light associated with virtual images within a field of view (FOV), comprising: an imager configured to produce the image light; a waveguide display including a polarization-sensitive in-coupling diffractive optical element (DOE) configured to in-couple image light into the waveguide display or transmit image light according to a state of polarization of the image light, at least one intermediate DOE configured to expand an exit pupil of the image light in a first direction of the FOV, and an out-coupling DOE configured to expand the exit pupil of the image light in a second direction of the FOV and further configured to out-couple image light out of the waveguide display to an eye of a user of the device; a pair of MEMS (micro electro mechanical system) scanners operatively coupled to perform raster scanning of the virtual images in the FOV using the image light from the imager, the MEMS scanners further providing the image light to the in-coupling DOE in the waveguide display; and a polarizing beam splitter device configured to direct image light to either a first MEMS scanner in the pair or a second MEMS scanner in the pair according to a state of polarization of the image light.

In another example, the polarizing beam splitter device includes a polarizing beam splitting cube comprising two right angle prisms joined along a plane defined by each prism's hypotenuse, the plane including a polarization-sensitive material configured to reflect or transmit image light based on the state of polarization, in which the reflected image light and transmitted image light have an orthogonal separation and the pair of MEMS scanners are respectively located with respect to the cube to receive the separated beams of image light. In another example, the device further includes a pair of quarter wave plates, each quarter wave plate respectively disposed adjacent to a MEMS scanner in the pair of MEMS scanners so that image light makes two passes through each quarter wave plate when the image light is reflected by each MEMS scanner, the state of polarization of the image light changing to an orthogonal state after each of the two passes. In another example, the polarization-sensitive in-coupling DOE includes at least a portion that is configured as one of a Bragg grating or grating having periodic features in two directions. In another example, the polarization-sensitive in-coupling DOE is located between the polarizing beam splitter device and one of the MEMS scanners in the pair of MEMS scanners. In another example, the imager is selected from one of laser, laser diode, light emitting diode, liquid crystal on silicon device, or organic light emitting diode array. In another example, the waveguide display is configured as a near-eye optical display. In another example, the image light propagates from the imager to the in-coupling DOE without passing through collimating or magnifying optics.

The compact display engine with MEMS scanners may also be utilized in non-portable devices, such as gaming devices, multimedia consoles, personal computers, vending machines, smart appliances, Internet-connected devices, and home appliances, such as an oven, microwave oven and other appliances, and other non-portable devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A near-eye optical display system configured to show images within a field of view (FOV) described by a first direction and a second direction, comprising:
   a waveguide display comprising one or more diffractive optical elements (DOEs) including an in-coupling DOE configured for in-coupling image light to the waveguide display;
   a polarizing beam splitter located proximate to the in-coupling DOE, the polarizing beam splitter configured to reflect image light having a first polarization state and transmit image light having a second polarization state;
   a first MEMS (micro electro mechanical system) scanner and configured to scan in the first direction of the FOV;
   a first quarter wave plate having an optical axis that is parallel to front and rear faces of the first quarter wave plate, the first MEMS scanner being disposed proximate to the front face and the polarizing beam splitter being disposed proximate to the rear face;
   a second MEMS scanner configured to scan in the second direction of the FOV; and
   a second quarter wave plate having an optical axis that is parallel to front and rear faces of the second quarter wave plate, the second MEMS scanner being disposed proximate to the front face and the polarizing beam splitter being disposed proximate to the rear face,
      wherein image light from an imager incident on the polarizing beam splitter propagates to each of the first and second MEMS scanners in succession so that the image light exits the polarizing beam splitter and is in-coupled into the waveguide display over the extent of the FOV as the first and second MEMS scanners are operated.

2. The near-eye optical display system of claim 1 in which the FOV is rectangular and each of the first and second MEMS scanners have a single scanning axis, and wherein the single scanning axis of the first MEMS scanner is orthogonal to the single scanning axis of the second MEMS scanner, and the first and second MEMS scanners are operated to perform raster scanning.

3. The near-eye optical display system of claim 1 in which the waveguide display further includes at least one intermediate DOE and an out-coupling DOE, wherein the one intermediate DOE provides exit pupil expansion in a first direction of the FOV and the out-coupling DOE provides exit pupil expansion in the second direction of the FOV.

4. The near-eye optical display system of claim 1 in which a propagation path of the image light in the near-eye optical display system includes two passes through each of the first and second quarter wave plates and wherein the image light changes its state of polarization after completion of each of the two passes.

5. The near-eye optical display system of claim 4 in which the image light is polarized in the first polarization state when incident on the polarizing beam splitter.

6. The near-eye optical display system of claim 1 in which one or more of the first and second MEMS scanners are operated resonantly.

7. A head mounted display (HMD) device configured to display images within a field of view (FOV) having first and second directions, comprising:
   a polarization beam splitter (PBS) cube having twelve edges and six faces including an entrance face and an exit face, the entrance and exit faces sharing a common edge, the PBS cube configured to reflect propagating image light having a first polarization state orthogonally to a direction of propagation and further configured to transmit image light having a second polarization state parallel to the direction of propagation;
   an in-coupling diffractive optical element (DOE) in a waveguide display that provides exit pupil expansion in the first and second directions of the FOV, the in-coupling DOE located adjacent to the exit face of the PBS cube;
   a first quarter wave plate located adjacent to a face of the PBS cube that is opposite the entrance face;
   a second quarter wave plate located adjacent to a face of the PBS cube that is opposite the exit face;
   a first MEMS (micro electro mechanical system) scanner having a reflective scanning plate and configured to scan in the first direction of the FOV, the first MEMS scanner located adjacent to the first quarter wave plate; and
   a second MEMS scanner having a reflective scanning plate and configured to scan in the second direction of the FOV, the second MEMS scanner located adjacent to the second quarter wave plate.

8. The HMD device of claim 7 wherein image light entering the entrance face passes through the PBS cube, makes a first pass through the first quarter wave plate, is reflected by the first MEMS scanner, makes a second pass through the first quarter wave plate, is reflected by the PBS cube towards the face opposite the exit face, makes a first pass through the second quarter wave plate, is reflected by the second MEMS scanner towards the exit face, makes a second pass through the second quarter wave plate, is passed through the PBS cube, exits the exit face to be in-coupled by the in-coupling DOE to the waveguide display.

9. The HMD device of claim 8 wherein the image light is generated by an imager comprising one or more lasers and the image light is in the second state of polarization when incident upon the entrance face of the PBS cube.

10. The HMD device of claim 7 wherein the first and second MEMS scanners are operated in combination to provide raster scanning through a fast axis and a slow axis.

11. The HMD device of claim 7 wherein the waveguide display includes at least one intermediate DOE configured to provide exit pupil expansion in the first direction and at least one out-coupling DOE configured to provide exit pupil expansion in the second direction and out-couple the image light from the waveguide display to an eye of an HMD device user.

12. The HMD device of claim 7 in which the image light enters the entrance face of the PBS cube in a direction that is parallel to a plane of the in-coupling DOE.

13. A device configured to control image light associated with virtual images within a field of view (FOV), comprising:
  an imager configured to produce the image light;
  a waveguide display including a polarization-sensitive in-coupling diffractive optical element (DOE) configured to in-couple image light into the waveguide display or transmit image light according to a state of polarization of the image light, at least one intermediate DOE configured to expand an exit pupil of the image light in a first direction of the FOV, and an out-coupling DOE configured to expand the exit pupil of the image light in a second direction of the FOV and further configured to out-couple image light out of the waveguide display to an eye of a user of the device;
  a pair of MEMS (micro electro mechanical system) scanners operatively coupled to perform raster scanning of the virtual images in the FOV using the image light from the imager, the MEMS scanners further providing the image light to the in-coupling DOE in the waveguide display; and
  a polarizing beam splitter device configured to direct image light to either a first MEMS scanner in the pair or a second MEMS scanner in the pair according to a state of polarization of the image light.

14. The device of claim 13 in which the polarizing beam splitter device includes a polarizing beam splitting cube comprising two right angle prisms joined along a plane defined by each prism's hypotenuse, the plane including a polarization-sensitive material configured to reflect or transmit image light based on the state of polarization, in which the reflected image light and transmitted image light have an orthogonal separation and the pair of MEMS scanners are respectively located with respect to the cube to receive the separated beams of image light.

15. The device of claim 13 further including a pair of quarter wave plates, each quarter wave plate respectively disposed adjacent to a MEMS scanner in the pair of MEMS scanners so that image light makes two passes through each quarter wave plate when the image light is reflected by each MEMS scanner, the state of polarization of the image light changing to an orthogonal state after each of the two passes.

16. The device of claim 13 in which the polarization-sensitive in-coupling DOE includes at least a portion that is configured as one of a Bragg grating or grating having periodic features in two directions.

17. The device of claim 13 in which the polarization-sensitive in-coupling DOE is located between the polarizing beam splitter device and one of the MEMS scanners in the pair of MEMS scanners.

18. The device of claim 13 in which the imager is selected from one of laser, laser diode, light emitting diode, liquid crystal on silicon device, or organic light emitting diode array.

19. The device of claim 13 in which the waveguide display is configured as a near-eye optical display.

20. The device of claim 13 in which the image light propagates from the imager to the in-coupling DOE without passing through collimating or magnifying optics.

* * * * *